US012090451B2

(12) United States Patent
Danieli et al.

(10) Patent No.: US 12,090,451 B2
(45) Date of Patent: *Sep. 17, 2024

(54) CARBONATION MACHINE AND A GAS CANISTER FOR A CARBONATION MACHINE

(71) Applicant: Sodastream Industries Ltd., Kfar Saba (IL)

(72) Inventors: Guy Danieli, Jerusalem (IL); Avi Cohen, Jerusalem (IL); Oren Shalev, Ashdod (IL); Mark Funt, Kfar Saba (IL); Allan Ring, Mercaz Shapira (IL); Amnon Shkedi, Pardes Hanna-Karkur (IL); Dvir Brand, Hod Hasharon (IL); Eyal Shmueli, Modi'in-Maccabim-Reut (IL); Amit Avigdor, Kibbutz Bahan (IL); Eran Shaashua, Adanim (IL); Hagai Harduff, Binyamina (IL); Doron Krom, Zikhron Yaacov (IL)

(73) Assignee: Sodastream Industries Ltd., Kfar Saba (IL)

( * ) Notice: Subject to any disclaimer, the term of this patent is extended or adjusted under 35 U.S.C. 154(b) by 79 days.

This patent is subject to a terminal disclaimer.

(21) Appl. No.: 17/889,394

(22) Filed: Aug. 17, 2022

(65) Prior Publication Data
US 2022/0387947 A1      Dec. 8, 2022

Related U.S. Application Data

(60) Division of application No. 17/566,655, filed on Dec. 30, 2021, now Pat. No. 11,433,362, which is a
(Continued)

(51) Int. Cl.
*B01F 23/00* (2022.01)
*A23L 2/54* (2006.01)
(Continued)

(52) U.S. Cl.
CPC ........... *B01F 23/2361* (2022.01); *A23L 2/54* (2013.01); *B01F 25/1051* (2022.01);
(Continued)

(58) Field of Classification Search
CPC .............. B01F 23/2361; B01F 33/5014; B01F 25/1051; B01F 23/237621; B01F 2101/14;
(Continued)

(56) References Cited

U.S. PATENT DOCUMENTS

| 2,644,313 A | 7/1953 | Griggs |
| 3,173,457 A | 3/1965 | Focht |

(Continued)

FOREIGN PATENT DOCUMENTS

| AT | 369881 | 2/1983 |
| CN | 2787987 | 6/2006 |

(Continued)

*Primary Examiner* — Steven O Douglas
(74) *Attorney, Agent, or Firm* — PEARL COHEN ZEDEK LATZER BARATZ LLP

(57) ABSTRACT

A carbonation machine may include a carbonation head, a holder that is configured to hold a gas canister, the holder comprising a connector with a socket configured to enable linear insertion of a valve of the canister into the socket, the socket including a seal with at least one lateral opening to enable fluidic flow between one or more laterally oriented ports of the valve and a conduit of the holder while preventing leakage of gas from the fluidic flow, and a holding mechanism configured to hold a lateral projection from the canister after insertion of the valve into the socket such that the valve remains in the socket, and an activation mechanism configured to operate the valve to release the gas from the canister when inserted into the socket so as to enable the gas to flow via the conduit to the carbonation head.

12 Claims, 38 Drawing Sheets

Related U.S. Application Data continuation of application No. 17/404,084, filed on Aug. 17, 2021, now Pat. No. 11,406,944, which is a continuation of application No. PCT/IL2020/050002, filed on Jan. 1, 2020, which is a continuation of application No. 16/411,870, filed on May 14, 2019, now abandoned.

(51) Int. Cl.

| | | |
|---|---|---|
| *B01F 23/2361* | (2022.01) | |
| *B01F 25/00* | (2022.01) | |
| *B01F 33/501* | (2022.01) | |
| *B65D 83/42* | (2006.01) | |
| *B65D 83/60* | (2006.01) | |
| *B67C 3/06* | (2006.01) | |
| *B67C 3/26* | (2006.01) | |
| *B67D 1/00* | (2006.01) | |
| *F17C 5/06* | (2006.01) | |
| *F17C 6/00* | (2006.01) | |
| *F17C 13/04* | (2006.01) | |
| *B01F 23/237* | (2022.01) | |
| *B01F 101/14* | (2022.01) | |

(52) U.S. Cl.
CPC ........ *B01F 33/5014* (2022.01); *B65D 83/425* (2013.01); *B65D 83/60* (2013.01); *B67C 3/065* (2013.01); *B67C 3/2614* (2013.01); *B67D 1/0057* (2013.01); *B67D 1/0071* (2013.01); *F17C 5/06* (2013.01); *F17C 6/00* (2013.01); *F17C 13/04* (2013.01); *A23V 2002/00* (2013.01); *B01F 23/237621* (2022.01); *B01F 2101/14* (2022.01); *B65D 83/42* (2013.01); *F17C 2205/0323* (2013.01); *F17C 2221/013* (2013.01); *F17C 2270/07* (2013.01)

(58) Field of Classification Search
CPC ......... A23L 2/54; B65D 83/425; B65D 83/60; B67C 3/065; B67C 3/2614; B67D 1/0057; B67D 1/0071; F17C 5/06; F17C 6/00; F17C 13/04; F17C 2205/0323; F17C 2221/013; F17C 2270/07; A23V 2002/00
See application file for complete search history.

(56) References Cited

U.S. PATENT DOCUMENTS

| | | |
|---|---|---|
| 3,179,132 A | 4/1965 | Focht |
| 3,180,374 A | 4/1965 | Muller |
| 3,438,408 A | 4/1969 | Hug |
| 4,082,123 A | 4/1978 | Haythornthwaite et al. |
| 4,350,647 A | 9/1982 | de la Cruz |
| 4,441,634 A | 4/1984 | Meshberg |
| 4,903,741 A | 2/1990 | Ibanez |
| 5,758,700 A | 6/1998 | Vanderploeg |
| 5,771,663 A | 6/1998 | Wold et al. |
| 6,152,190 A | 11/2000 | Smith |
| 6,169,276 B1 | 1/2001 | Meyer |
| 6,202,982 B1 | 3/2001 | Huguet et al. |
| 6,648,028 B2 | 11/2003 | Hulley et al. |
| 7,730,911 B2 | 6/2010 | Pericard |
| 7,967,276 B2 | 6/2011 | Tsung |
| 8,695,651 B2 | 4/2014 | Frenal et al. |
| 8,757,148 B2 | 6/2014 | Montgomery et al. |
| 8,863,786 B2 | 10/2014 | Hosoda et al. |
| 8,888,073 B2 | 11/2014 | Leung et al. |
| 9,302,229 B2 | 4/2016 | Leung et al. |
| 10,307,718 B2 | 6/2019 | Waisman |
| 2002/0036025 A1 | 3/2002 | Hully et al. |
| 2004/0051212 A1 | 3/2004 | Michael |
| 2008/0078769 A1 | 4/2008 | Crunkleton |
| 2009/0101215 A1 | 4/2009 | Colby et al. |
| 2010/0006603 A1 | 1/2010 | Weinberg et al. |
| 2012/0006828 A1 | 1/2012 | Frenal et al. |
| 2012/0116292 A1 | 5/2012 | Montgomery et al. |
| 2013/0089645 A1 | 4/2013 | Leung et al. |
| 2015/0367296 A1 | 12/2015 | Cohen et al. |
| 2016/0152457 A1 | 6/2016 | Godet et al. |
| 2017/0184344 A1 | 6/2017 | Sillince |
| 2018/0200682 A1 | 7/2018 | Waisman |
| 2018/0282143 A1 | 10/2018 | Chang et al. |
| 2020/0338507 A1 | 10/2020 | Cohen et al. |
| 2020/0360875 A1 | 11/2020 | Danieli et al. |

FOREIGN PATENT DOCUMENTS

| | | |
|---|---|---|
| CN | 101189469 | 5/2008 |
| CN | 104712772 | 6/2015 |
| CN | 104819380 | 8/2015 |
| CN | 105050919 | 11/2015 |
| CN | 205424415 U | 8/2016 |
| CN | 208138526 U | 11/2018 |
| CN | 109367997 | 2/2019 |
| CN | 110382945 | 10/2019 |
| CN | 110573788 | 12/2019 |
| CO | 16065028 | 6/2003 |
| CO | 04064947 | 2/2015 |
| DE | 598186 | 6/1934 |
| DE | 1741098 U | 3/1957 |
| DE | 1532516 | 1/1970 |
| DE | 2551696 | 6/1977 |
| DE | 10037955 | 3/2002 |
| DE | 10058496 | 6/2002 |
| DE | 10 2005 026187 | 12/2006 |
| DE | 102006049747 | 8/2008 |
| DE | 102009012267 | 9/2009 |
| EA | 13115 | 2/2010 |
| EA | 33994 | 12/2019 |
| EP | 0173822 | 3/1986 |
| EP | 0545444 | 6/1993 |
| EP | 2441499 | 4/2012 |
| EP | 2883833 | 6/2015 |
| FR | 2922294 | 4/2009 |
| GB | 817394 | 7/1959 |
| GB | 1345807 | 2/1974 |
| GB | 2074884 | 11/1981 |
| GB | 2190007 | 11/1987 |
| JP | S59139918 | 8/1984 |
| JP | 5127243 | 1/2013 |
| RU | 174397 | 10/2017 |
| TW | 2020/41276 | 11/2020 |
| WO | WO 2004/051388 | 6/2004 |
| WO | WO 2006/067527 | 6/2006 |
| WO | WO2006113428 | 10/2006 |
| WO | WO2009/125180 | 10/2009 |
| WO | WO-2012/004482 | 1/2012 |
| WO | WO-2012/110887 | 8/2012 |
| WO | WO-2015/008249 | 1/2015 |
| WO | WO 2015/118525 | 8/2015 |
| WO | WO 2017/195190 | 11/2017 |
| WO | WO2018/134809 | 7/2018 |
| WO | WO-2020/230115 | 11/2020 |
| WO | WO2021/137206 | 7/2021 |

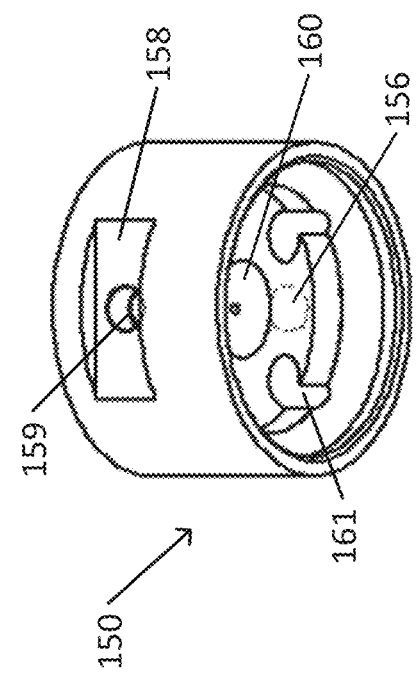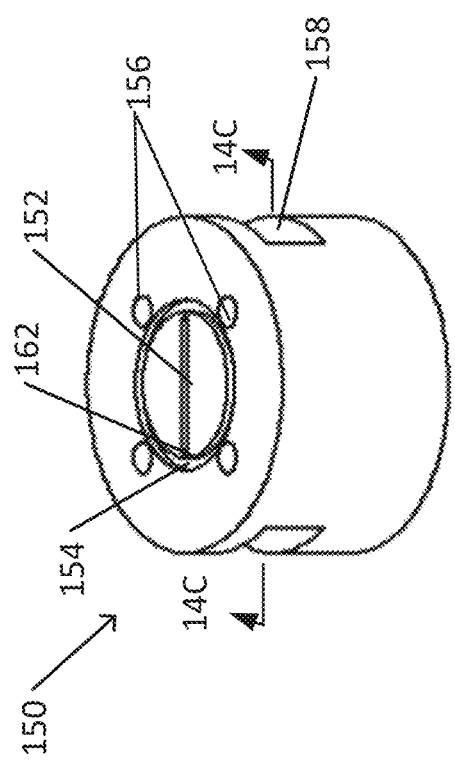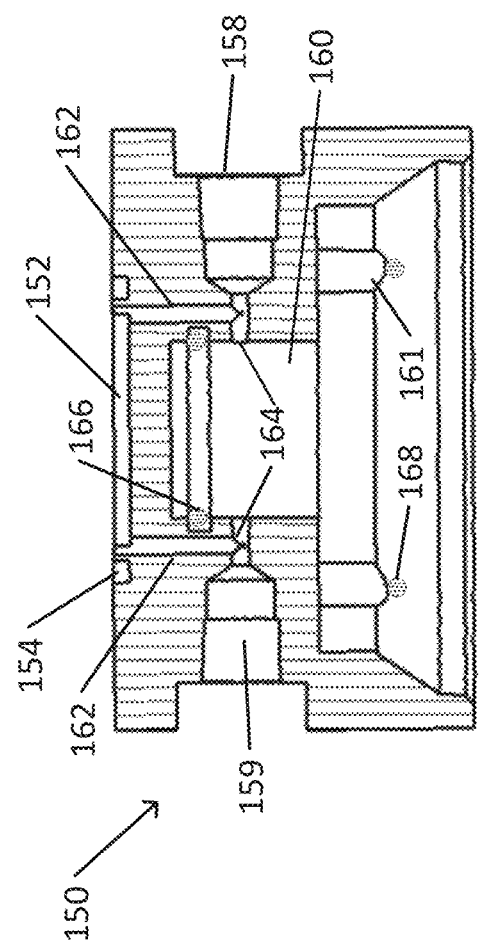

CARBONATION MACHINE AND A GAS CANISTER FOR A CARBONATION MACHINE

CROSS-REFERENCE

The present application is a Divisional Application of U.S. patent application Ser. No. 17/566,655, filed Dec. 30, 2021, which is a Continuation Application of U.S. patent application Ser. No. 17/404,084, filed Aug. 17, 2021, now U.S. Pat. No. 11,406,944, which is a Continuation Application of International Patent Application PCT/IL2020/050002, filed Jan. 1, 2020, claiming priority from U.S. patent application Ser. No. 16/411,870, filed May 14, 2019, all of which are hereby incorporated by reference.

FIELD OF THE INVENTION

The present invention relates to carbonation machines. More particularly, the present invention relates to a carbonation machine and to a gas canister for a carbonation machine.

BACKGROUND OF THE INVENTION

Carbonation machines are commonly used in homes, offices, cafeterias, and other settings. A typical carbonation machine may be operated to inject carbon dioxide into water or another liquid that is in a bottle that may be attached to the machine. Other types of carbonation machines may be configured to dispense carbonated beverages into cups or other containers.

The carbon dioxide gas that is injected into liquid to carbonate the liquid is typically provided in canisters of compressed or liquefied gas. The carbonation machine includes a user-operable mechanism for releasing gas from the cylinder and conducting the gas to the liquid to be carbonated. Typically, operation of the gas release mechanism causes the mechanism to open a valve of the cylinder. When the gas canister is installed in the carbonation machine, a valve head that includes the valve is connected to a gas canister connector of the carbonation machine.

When a cylinder has been emptied of gas, the empty cylinder may be replaced with a full cylinder. This replacement is typically performed by a user of the machine. For example, a valve head of the cylinder may be provided with exterior male threading which may be connected to the gas canister connector by screwing into interior threading of a socket of the connector.

SUMMARY OF THE INVENTION

There is thus provided, in accordance with an embodiment of the invention, a carbonation machine including: a carbonation head; a holder that is configured to hold a gas canister, the holder including a connector with a socket, the socket including a seal with at least one lateral opening to enable fluidic flow between one or more laterally oriented ports of a valve of the canister into the socket to enable fluidic flow between the valve and a conduit of the holder while preventing leakage of gas from the fluidic flow, and a holding mechanism configured to hold a lateral projection from the canister after insertion of the valve into the socket such that the valve remains in the socket; and an activation mechanism configured to operate the valve to release the gas from the canister when inserted into the socket so as to enable the gas to flow via the conduit to the carbonation head.

Furthermore, in accordance with an embodiment of the invention, the seat includes two gaskets, the lateral opening including a gap between the two gaskets.

Furthermore, in accordance with an embodiment of the invention, each of the two gaskets is shaped in the form of an O-ring with flattened faces.

Furthermore, in accordance with an embodiment of the invention, each of the two gaskets has a U-shaped cross section oriented such that openings of the two gaskets face one another.

Furthermore, in accordance with an embodiment of the invention, the seat includes a single gasket with one or more opening holes.

Furthermore, in accordance with an embodiment of the invention, the gasket has a U-shaped cross section.

Furthermore, in accordance with an embodiment of the invention, an opening of the U-shaped gasket faces inward, and the opening holes are located on an outward facing convex surface of the gasket.

Furthermore, in accordance with an embodiment of the invention, an opening of the U-shaped gasket faces outward, and the opening holes are located on an inward facing convex surface of the gasket.

Furthermore, in accordance with an embodiment of the invention, the holding mechanism includes a plurality of teeth that are outwardly slidable to enable insertion of a the lateral projection of the valve and inwardly slidable to prevent removal of the lateral projection past the teeth, wherein a release mechanism to enable removal of the valve from the socket is configured to outwardly retract the teeth to enable passage of the lateral projection.

Furthermore, in accordance with an embodiment of the invention, the holding mechanism includes a yoke with a noncircular opening configured to allow passage of the lateral projection, the lateral projection including a noncircular lateral projection, when the noncircular lateral projection is aligned with the opening, and to prevent passage of the noncircular lateral projection when the canister is rotated such that the noncircular lateral projection is not aligned with the opening.

Furthermore, in accordance with an embodiment of the invention, the carbonation machine includes a yoke that is configured to support that lateral projection and a handle that is raisable to enable placement of the lateral projection on the yoke, the handle connected by a hinged lever mechanism to the yoke such that when the handle is lowered, the yoke raises the valve to insert the valve into the socket.

Furthermore, in accordance with an embodiment of the invention, the handle includes a cover that is configured to cover at least part of the canister when the handle is lowered.

Furthermore, in accordance with an embodiment of the invention, a base of the carbonation machine includes an opening for placement of the canister, wherein a part of a floor of the opening is raised so as to tilt the canister when placed into the opening to tilt into an orientation that is aligned with the socket.

Furthermore, in accordance with an embodiment of the invention, the carbonation machine includes a cradle that is tiltable outward to enable insertion of the canister into the cradle, the cradle configured, when rotated inward, to insert the valve into the socket.

Furthermore, in accordance with an embodiment of the invention, the carbonation machine includes a platform for supporting the canister erectly and configured, when rotated, to lift the canister to insert the valve into the socket.

There is further provided, in accordance with an embodiment of the invention, a canister for connection to a carbonation machine, the canister configured to hold a pressurized or liquefied gas for enabling the machine to carbonate a liquid, the canister including a valve that is configured to hold the gas in the canister when closed, and to provide a fluidic connection between the canister and the carbonation machine or a source of the gas when opened, the valve including: a body that includes at one end a canister port oriented along a longitudinal axis of the body and that is configured to be inserted into the canister, and at least two exterior ports that open laterally to the longitudinal axis and are substantially equally spaced about the longitudinal axis; a poppet that is slidable along the longitudinal axis and which, when in an open position, allows fluidic communication between the exterior ports and the canister port to enable inflow to the canister via said at least two exterior ports or outflow from the canister via said at least two exterior ports, and which, when in a closed position that is more distal to the canister port than the open position, prevents fluid communication between the exterior ports and the canister port; a resilient restoring structure configured to apply a restoring force to the poppet to maintain the poppet at the closed position; a plunger with an exterior surface that is exposed to the exterior of the body and configured, when an inward pushing force that overcomes the restoring force is applied to the plunger, to slide the poppet from the closed position to the open position; and a gasket configured to fluidically isolate the exterior surface of the plunger being from a path of fluidic flow between the exterior ports and the canister port.

Furthermore, in accordance with an embodiment of the invention, a cross section of the gasket is U-shaped, an opening of the gasket being oriented toward the canister.

Furthermore, in accordance with an embodiment of the invention, the exterior ports are oriented substantially perpendicular to the longitudinal axis.

There is further provided, in accordance with an embodiment of the invention, a valve for closing and opening a gas canister, the valve including: a body that includes at one end a canister port oriented along a longitudinal axis of the body and that is configured to be inserted into the canister, and at least two exterior ports that open laterally to the longitudinal axis and are substantially equally spaced about the longitudinal axis; a poppet that is slidable along the longitudinal axis and which, when in an open position, allows fluidic communication between the exterior ports and the canister port to enable inflow to the canister via said at least two exterior ports or outflow from the canister via said at least two exterior ports, and which, when in a closed position that is more distal to the canister port than the open position, prevents fluid communication between the exterior ports and the canister port; a resilient restoring structure configured to apply a restoring force to the poppet to maintain the poppet at the closed position; a plunger with an exterior surface that is exposed to the exterior of the body and configured, when an inward pushing force that overcomes the restoring force is applied to the plunger, to slide the poppet from the closed position to the open position; and a gasket configured to fluidically isolate the exterior surface of the plunger being from a path of fluidic flow between the exterior ports and the canister port.

Furthermore, in accordance with an embodiment of the invention, a cross section of the gasket is U-shaped, an opening of the gasket being oriented toward the canister.

There is further provided, in accordance with an embodiment of the invention, an adapter including: an opening that is shaped to enable insertion of a valve of a gas canister that is configured to hold a pressurized or liquefied gas for carbonating a liquid, the valve including at one end a canister port oriented along a longitudinal axis of a body of the valve and that is configured to be inserted into the canister, at least one exterior port that opens laterally, and a gasket configured to fluidically isolate an exterior surface of a plunger of the valve, the plunger configured, when an inward pushing force that overcomes a restoring force is applied to the plunger, to enable fluidic communication between the at least one exterior port and the canister port; and at least one channel that is configured to conduct pressurized gas from a longitudinally oriented filling port of a canister filling system to one or more lateral channels that are in fluidic communication with the at least one exterior port of a valve that is inserted into the opening.

Furthermore, in accordance with an embodiment of the invention, the valve includes structure to enable attachment of the adapter to a filling head of the filling system.

Furthermore, in accordance with an embodiment of the invention, the at least one channel includes at least one laterally oriented channel that is configured to be in fluidic communication with the filling port when the adapter is attached to the filling head.

Furthermore, in accordance with an embodiment of the invention, the adapter includes structure to enable attachment of the adapter to the valve, a distal end of the adapter configured to connect to a filling head of the filling system.

Furthermore, in accordance with an embodiment of the invention, the at least one channel includes a longitudinally oriented channel at the distal end that is configured to be in fluidic communication with the filling port when the distal end is connected to the filling head.

BRIEF DESCRIPTION OF THE DRAWINGS

In order for the present invention to be better understood and for its practical applications to be appreciated, the following Figures are provided and referenced hereinafter. It should be noted that the Figures are given as examples only and in no way limit the scope of the invention. Like components are denoted by like reference numerals.

FIG. 14A schematically illustrates a filling head adapter to enable connection of a gas canister valve with laterally oriented exterior ports to filling head of a canister filling system.

FIG. 14B schematically illustrates a view of the canister valve adapter shown in FIG. 14A, showing a side of the adapter into which the canister valve is insertable.

FIG. 14C is a schematic cross sectional view of the canister valve adapter shown in FIG. 14A.

DETAILED DESCRIPTION OF THE INVENTION

Figure 1:
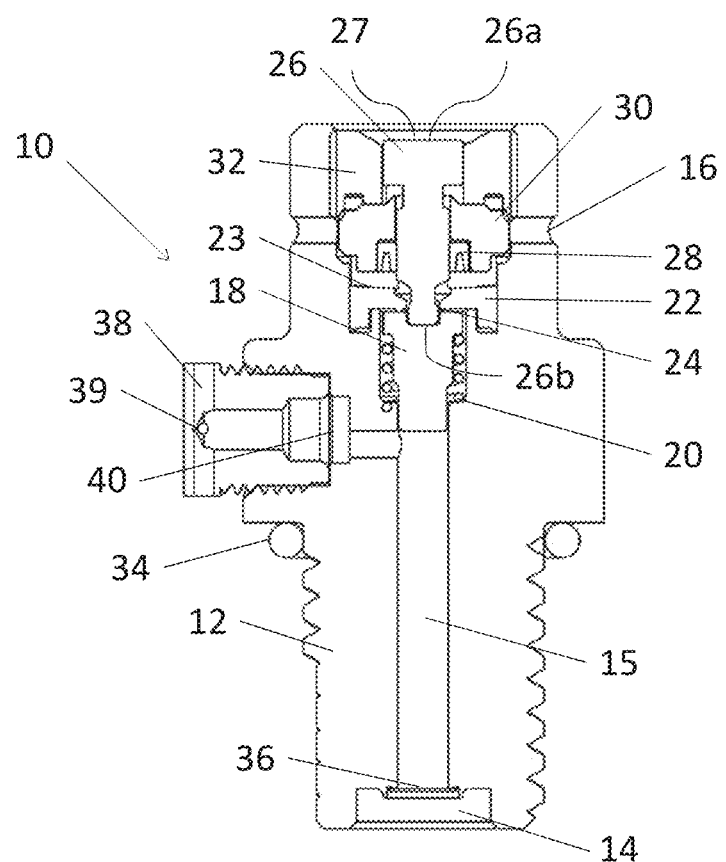
FIG. 1 is a schematic sectional view of an example of a gas canister valve.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two Or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

In accordance with an embodiment of the present invention, a canister holder of a carbonation machine, or of a canister filling system for filling gas canisters for use with carbonation machines, is configured to enable linear insertion of a valve of the gas canister into a socket of the canister holder so as to enable flow of gas (e.g., carbon dioxide) between the gas canister and a machine or system that includes the canister holder. Similarly, the holder is configured to enable linear removal of the valve from the socket. As used herein, linear insertion refers to insertion and connection to the socket that does not include multiple rotations of the canister to screwing threading on the gas canister (e.g., on the valve) into threading of the holder or socket.

For example, a carbonation machine may be operable to open a valve of the gas canister to release the gas from the canister. The carbonation machine includes an arrangement of one or more conduits that are configured to cause the released gas to flow to a carbonation head of the carbonation machine. A bottle or other container of a liquid such as water may be attached to the carbonation head such that the released gas enters, and may carbonate, the liquid.

In this manner, insertion or replacement of a gas canister may be facilitated. Facilitation of canister insertion or removal may enable quick and simple replacement of a canister by unskilled users, without risk of overtightening or otherwise risking damage to a seal between the canister holder and the canister.

In one example, the canister holder may be configured to enable manual (or mechanically assisted) snapping an end of the canister, typically an end that includes a valve that is operable to release gas (e.g., carbon dioxide) from the canister (or to enable filling of the canister from a source of gas). For example, slidable or retractable projections or teeth on the canister holder may be configured to engage one or more corresponding projections from the canister. In another example, insertion may include insertion via an opening when the canister is oriented in one orientation (e.g., with a noncircular projection on the canister aligned with a correspondingly noncircular opening on the canister holder) and afterward rotating the canister to another orientation to hold the canister to the canister holder.

Alternatively or in addition, the canister holder, or a part of a carbonation machine (or canister filling system) that is associated with the canister holder, may include a canister insertion mechanism that couples a canister insertion mechanism to a mechanism for connecting a valve of the canister to the connector of the canister holder.

For example, the canister insertion mechanism may include a handle (e.g., in some cases functioning as a door or cover) that is closed over the canister after placement of a projection from the canister into a yoke. Closing the handle may lift the yoke and the projection, thus inserting the valve into the connector. In another example, the canister may be placed in a tillable cradle when the cradle is tilted outward. Tilting the cradle inward to an erect orientation may lift the canister and insert the valve into the connector. In another example, the canister may be placed (e.g., erect) on a base. Operating of a mechanism, e.g., rotation of the base, may lift the canister so as to insert the valve into the connector.

A gas canister valve that is configured for insertion into a carbonation machine using an insertion motion (e.g., without multiple rotations of the gas canister in order to screw the valve into a canister holder of the carbonation machine) may be designed to avoid generation of thrust that would tend to separate the canister valve from a connector of the machine. Accordingly, the valve may be designed, e.g., with ports for release of the gas aimed laterally and substantially equally spaced about the perimeter of the valve (e.g., two ports on substantially opposite sides), to generate minimal (e.g., approximately zero) thrust in a direction away from the connector.

When the valve is connected to a canister holder of a carbonation machine, a mechanism of the carbonation machine may be operated in order to release gas from the canister. The released gas may flow to a carbonation head of the carbonation machine in order to carbonate liquid contents of a bottle or other container that is connected to the carbonation head, or that is otherwise configured to enable injection of the gas into the liquid.

Similarly, the gas canister valve is configured to enable connection of the valve to a canister holder of a filling head of a canister filling system. When connected to the filling head, the canister filling system may be operated to fill the canister with pressurized or liquefied gas.

A proximal (e.g., to a connection of the gas canister valve to the carbonation machine or filling system) end of a body of the gas canister valve is configured to connect to the canister holder. A longitudinal axis of the gas canister valve is considered to be an axis that passes through the gas canister valve along a direction of motion of an activation mechanism of the valve (typically in the form of a slidable poppet that is configured to slide along the longitudinal axis).

A distal end of the gas canister valve may be inserted into and attached (e.g., by threading, welding, or otherwise) to the gas canister. The distal end includes an interior canister port that is insertable into, and open to, the canister.

The body of the gas canister valve also includes two or more exterior ports that open laterally to the longitudinal axis (e.g., each oriented at an angle of at least 80°, and typically of at least 90°, from the direction of the connection to the canister holder) of the valve, and are spaced at substantially equal angular intervals about (e.g., two exterior ports substantially on opposite sides of) the (longitudinal axis of) the canister body. The exterior ports are configured to enable escape of the gas from the canister when the valve is opened by a gas release mechanism of the valve is activated (e.g., by causing distal motion of a poppet within the valve). When the valve is opened and the gas canister valve is connected to a canister holder of a filling system, filling of the canister with pressurized or liquefied gas via the exterior ports may be enabled.

The laterally equally spaced locations of the exterior ports may direct any gas that escapes from the canister, whether by intentional operation of the gas release mechanism or otherwise, in equally spaced lateral directions. As a result, the lateral thrust generated by release of the gas through one of the exterior ports may be opposed by the thrust that is generated by release of the gas via the other exterior ports.

The laterally equally spaced arrangement of the exterior polls may be advantageous over a typical arrangement in which the port releases the gas along the longitudinal direction. With a longitudinally arranged port, the released gas may generate a thrust that tends to push the canister away from its connection. Accordingly, with such a longitudinally arranged port, a connection that includes screwing the valve into a threaded socket may be required. The thrust generated by release of gas via a lateral port or ports will not generate a force that tends to separate the gas canister from the canister holder because it is perpendicular to the direction of insertion or removal of the gas canister for the gas canister holder. Accordingly, a canister holder may include a snap-in or other arrangement that does not include a threaded socket. Therefore, connection and removal of a gas canister and valve with a lateral port may be simpler than connection and removal of a canister and valve with a longitudinally arranged port.

Typically, the valve may be opened or closed by sliding a poppet along a longitudinal axis of the valve. Typically, when the poppet is slid distally away from the canister holder, the valve is open, enabling fluid communication within the body of the valve between the interior of the canister via the canister port and the exterior ports. Conversely, when the poppet is slid proximally toward the canister holder, the valve is closed such that fluid communication between the exterior ports and the interior of the canister is blocked. For example, a proximal end of the poppet may be pressed against a sealing gasket to prevent fluid communication between the canister port and the exterior ports. Opening the valve enables inflow from a fluid source (e.g., of a canister filling system) to the canister via the exterior ports or outflow of fluid from the canister via the canister port and the exterior ports (e.g., to a carbonation machine).

One or more types of sealing structure may be included in the gas canister valve to prevent flow of gas around the plunger. For example, a cross-section of a gasket that surrounds the plunger may be U-shaped. The opening of the U-shape may be oriented toward the interior of the canister. Thus, when the plunger is moved to release gas from the canister, the pressurized gas may fill the opening of the U-shaped gasket so as to push the walls of the gasket outward, reinforcing the seal around the plunger and preventing escape of the released gas around the plunger.

A plunger for causing the poppet of the valve to slide distally is configured to be accessible to an activation mechanism, e.g., of a carbonation machine or canister filling system. Typically, the plunger includes an exterior surface that may be contacted and operated by an actuation mechanism that is located in a canister holder, e.g., of a carbonation machine of a canister filling system. A proximal end of the plunger may include an exterior surface forming a pushbutton. The proximal end of the plunger may be located within an indentation at the proximal surface of the gas canister valve. The indentation may prevent accidental pressing of the plunger, e.g., by a surface that is wider than the indentation.

When a pushing force is applied to the proximal end of the plunger, the plunger may be moved distally, e.g., along an axis that is collinear with the longitudinal axis of the poppet. A distal end of the plunger may be configured to contact and press against a proximal end of the poppet when the plunger is pushed distally. Therefore, pushing the pushbutton at the proximal end of the plunger may push the poppet distally to open the gas canister valve. For example, an activation mechanism of a carbonation machine or filling system may include an extendible rod or other component that may press the pushbutton at the proximal end of the gas canister valve. When the activation mechanism applies a force that is at least as great as a predetermined force, the poppet may be slid sufficiently distally in order to enable the fluidic connection between the canister port and the exterior ports.

The plunger may be produced as a separate component from the poppet. Alternatively, the plunger may be manufactured as an integral part of the poppet, forming a proximal end of the poppet.

Typically, the gas canister valve also includes a restoring structure to maintain the poppet in the (e.g., proximal) closed position when a sufficiently large force is not applied to the exterior surface. For example, a spring may be configured to push the poppet proximally unless the force of the spring is overcome by a distal pushing force that is applied to the poppet, e.g., via the plunger.

The gas canister valve may include structure to enable or facilitate holding of the gas canister by a canister holder, e.g., of a carbonation machine or of a canister filling system. For example, the gas canister valve may include one or more projections that may be fitted into cooperating structure, e.g., one or more grooves or slots, of the canister holder. When the gas canister is held by the canister holder, the canister holder may be configured to connect the exterior ports of the gas canister valve to one or more conduits, e.g., that are associated with the canister holder.

For example, a lateral projection in the form of a disk may extend laterally outward, e.g., at or near a connection of the gas canister valve to the gas canister. The disk may be configured for insertion into a corresponding yoke of the canister holder. The disk may be inserted as a washer between the gas canister valve and the canister or may be manufactured as an integral part of the gas canister valve or canister.

For example, the yoke may include U-shaped groove whose width is sufficient to accommodate the thickness of the disk. When no gas canister is held by the canister holder such that the yoke is vacant, the disk of the gas canister may slide into the groove of the yoke. When the disk is fully inserted into the yoke, a closing mechanism of the canister holder may be operated to insert the proximal end of the gas canister valve into a cooperating connector associated with (e.g., integral to or adjacent to) the canister holder. For example, the closing mechanism may include a handle, lever, or other force-transmitting structure to lift the proximal end of the gas canister valve into a sealed socket of a carbonation machine or canister filling system. The operation of the closing mechanism may include closing a handle (e.g., functioning as a cover, door, or shutter) e.g., that may at least partially cover the gas cylinder when it is connected to the connector.

Alternatively or in addition, the yoke may include two or more teeth or arms that are extendible to grasp the disk when the gas canister valve is inserted into the connector.

Alternatively or in addition, a disk may be asymmetric. The asymmetry may enable insertion of the asymmetric disk through a matching asymmetric opening in a yoke when the asymmetric disk is aligned with the asymmetric opening. Rotation of the asymmetric disk (e.g., by 90°) to an orientation where the asymmetric disk is no longer aligned with the asymmetric opening may retain the asymmetric disk in the yoke. In this case, the closing mechanism may be configured to, in addition to insertion of the proximal end of the gas canister valve into a sealed connector, rotate the gas cylinder (e.g., by 90°) to retain the asymmetric disk in the yoke of the canister holder.

A connector for enabling flow of gas between the gas canister valve to a carbonation machine, canister-filling system, or other device may include a socket that includes sealing structure. The sealing structure may be configured to enable a fluid connection between the exterior ports of the gas canister valve and a gas conduit of the connector, while preventing leakage of gas in other directions. For example, the sealing structure may include two or more gaskets between which gas may be flow between a conduit of the connector and the exterior ports of the gas canister valve. Alternatively or in addition, a gasket of the sealing structure may include one or more openings through which gas may flow. The gasket may have a U-shape that may expand when filled with pressurized gas to further enhance the sealing.

In some cases, a filling head adapter may be attached to a filling head of a canister filling system in order to enable filling of gas canister that is provided with a gas canister valve with laterally oriented exterior ports. For example, the filling head adapter may provide a fluidic path between a filling port of the canister filling system that is coaxial with the longitudinal axis of the gas canister and the laterally positioned exterior ports of the gas canister valve. The fluidic path may include one or more grooves, channels, tubes, or other structure to enable fluidic flow of pressurized gas (or liquefied gas) from the filling port of the canister filling system to the exterior ports of the gas canister valve. For example, the filling head adapter may be bolted or otherwise attached to the filling head.

In some cases, a canister valve adapter may be attachable to a gas canister valve with laterally oriented exterior ports. Fitting a canister valve adapter onto the gas canister valve may enable filling of the gas canister by insertion of the canister valve adapter into a filling head of the canister filling system with an axial (longitudinal) filling port. The canister valve adapter is configured to provide a fluidic path between a filling port of the canister filling system that is coaxial with the longitudinal axis of the gas canister and the laterally positioned exterior ports of the gas canister valve. Typically, the fluidic path that is provided by the canister valve adapter includes a system of closed tubes or channels between the filling port and the exterior ports of the gas canister valve.

Figure 2:
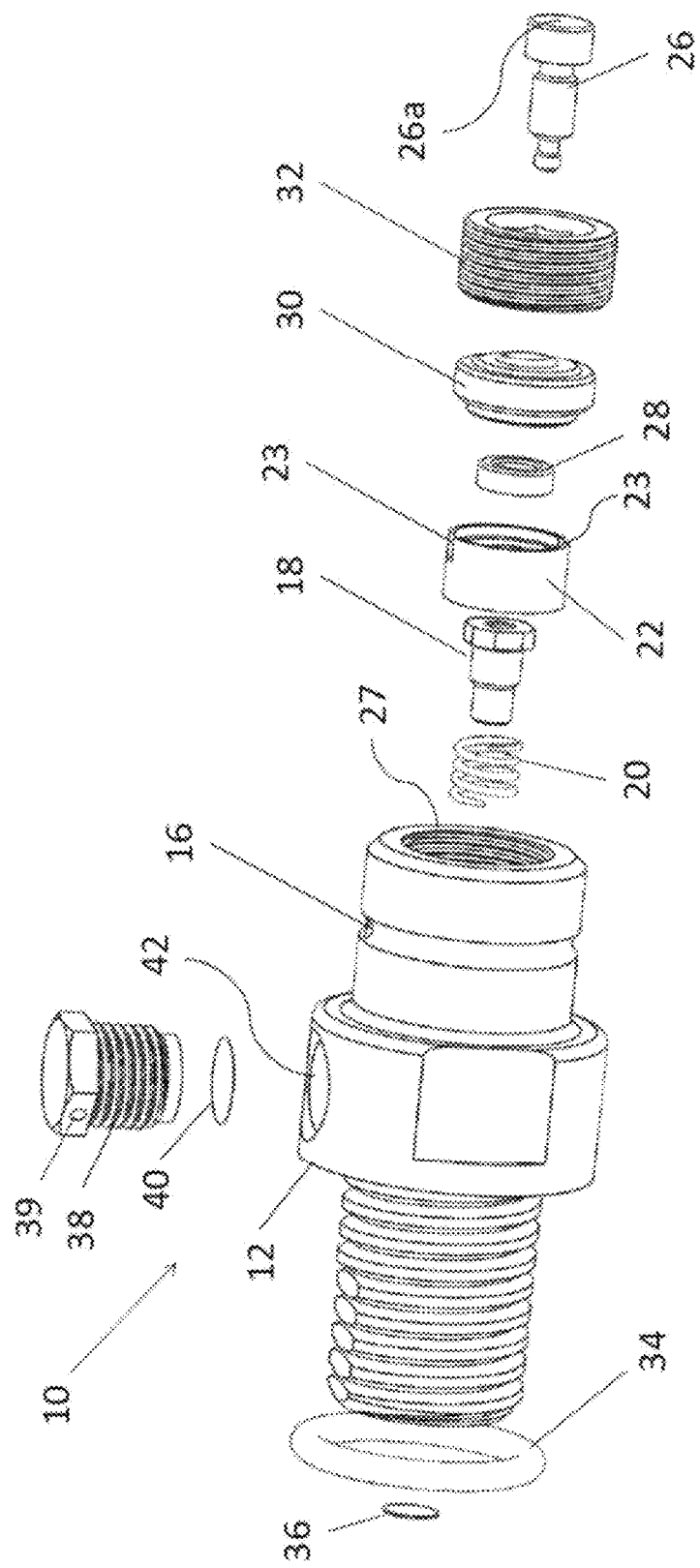
FIG. 2 is a schematic exploded view of the gas canister valve shown in FIG. 1.
Figure 3A:
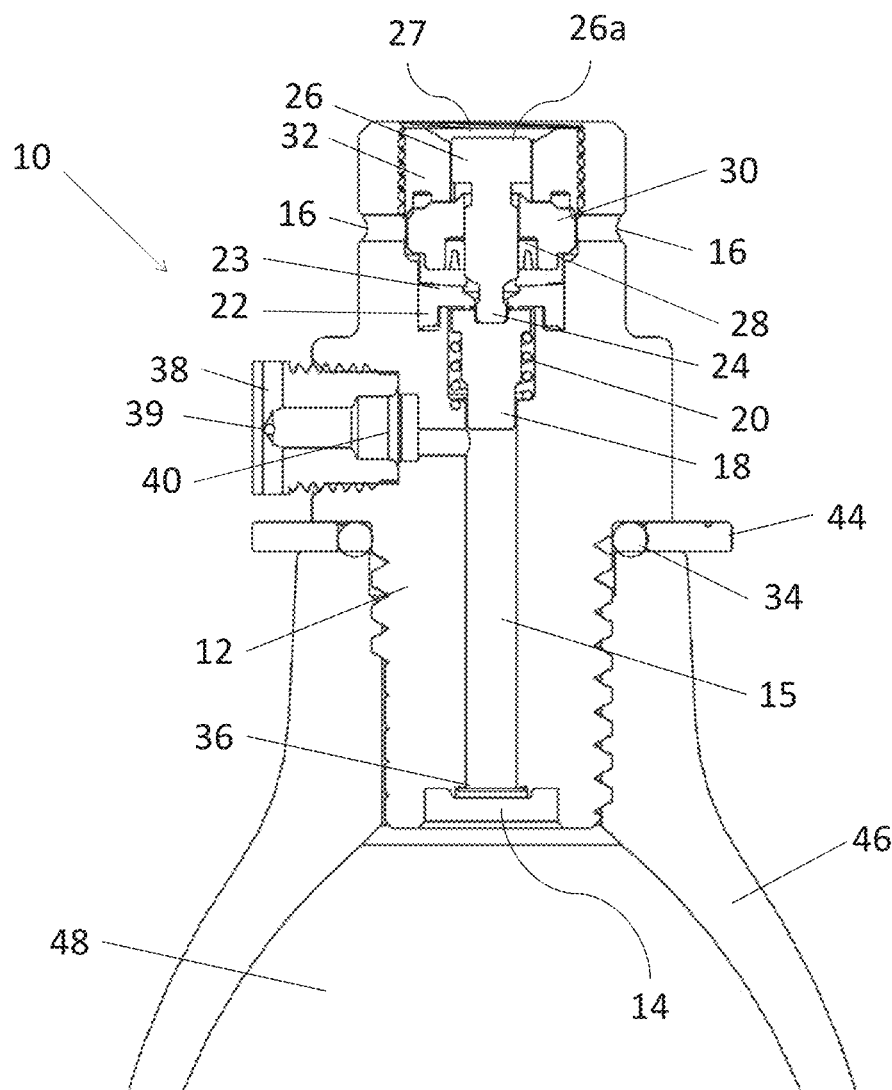
FIG. 3A is a schematic sectional view of the gas canister valve shown in FIG. 1, when the valve is closed.

FIG. 1 is a schematic sectional view of an example of a gas canister valve. FIG. 2 is a schematic exploded view of the gas canister valve shown in FIG. 1. FIG. 3A is a schematic sectional view of the gas canister valve shown in FIG. 1, when the valve is closed.

Internal components of gas canister valve 10 are enclosed within valve body 12. Typically, valve body 12 is made of brass or another metal. An end of valve body 12 that includes canister port 14 is configured to be inserted into a gas canister 46. An interface between valve body 12 may be sealed by gasket 34. Gas may flow from interior cavity 48 of gas canister 46 into central channel 15 via canister port 14 and gas filter 36.

In order to enable controlled release of gas from gas canister 46 in the event of overpressure, gas canister 46 is provided with burst disk 40. Burst disk 40 is held in place between burst disk plug 38 and valve body 12. In the event of overpressure that is sufficient to rupture burst disk 40, gas within central channel 15 may, after rupturing burst disk 40, flow outward through burst disk plug 38 and escape to the ambient atmosphere via gas escape opening 39 in burst disk plug 38.

In some cases, disk 44 may be held between valve body 12 and gas canister 46. Disk 44 may be configured to fit into a corresponding slot or groove of a canister holder. Alternatively or in addition to disk 44, one or more projections that are integral to valve body 12 may extend laterally out of valve, body 12 to engage cooperating structure of the canister holder. Alternatively or in addition, valve body 12 may include one or more indentations that are configured to engage one or more cooperating projections of the canister holder.

When gas canister valve 10 is inserted into gas canister 46 and gas canister valve 10 is opened, gas from gas canister 46 may be released via a pair of oppositely oriented exterior ports 16. In this way, the net thrust generated by release of gas via the pair of exterior ports 16 may be close to zero.

In some examples, a gas canister valve may include more than two oppositely oriented exterior ports 16. For example, the additional pairs of exterior ports 16 may be oriented to evenly distribute exterior ports 16 about the perimeter of valve body 12.

When gas canister valve 10 is closed, as shown, valve poppet 18 is pressed by spring 20 against valve seat 24 of (e.g., in the form of a circular ridge that extends from the surface of) insert 22. Therefore, all fluidic connection between interior cavity 48 of gas canister 46 and exterior ports 16 is blocked.

Gas canister valve 10 may be opened by application of a pushing force to exterior surface 26a of plunger 26. Exterior surface 26a is exposed to, and is mechanically accessible to (e.g., may be pushed by), an actuator, e.g., of a carbonation machine or of a canister filling system, to which gas canister valve 10 is connected. Typically, the pushing force may be applied by an activating rod that is located within, or is otherwise associated with, the canister holder. Exterior surface 26a may be located within an indentation 27 at an exterior end of valve body 12. Location of exterior surface 26a within an indentation 27 may prevent accidental or unintentional application of a pushing force to plunger 26.

Applying a pushing force to exterior surface 26a pushes plunger 26 toward valve poppet 18. When the pushing force that is applied to exterior surface 26a is sufficient to overcome the opposing force that is exerted by spring 20 and by pressure of the gas within gas canister 46, end 26b of plunger 26 may push valve poppet 18 away from valve seat 24.

When valve poppet 18 is no longer pressed against valve seat 24, gas may begin to flow between valve poppet 18 and insert 22. For example, during carbonation, interior cavity 48 of gas canister 46 is assumed to be filled with pressurized or liquefied gas. When flow is enabled between valve poppet 18 and insert 22, gas may flow outward via grooves 23 of insert 22 around seal housing 30 to exterior ports 16. The gas that is released via exterior ports 16 may then be directed by a connector to a carbonation head where the gas is injected into a liquid to be carbonated. On the other hand, when exterior ports 16 are connected to a filling system, pressurized or liquefied gas may be injected into exterior ports 16, to flow inward around seal housing 30, via grooves 23 of insert 22, and between insert 22 and valve poppet 18 via central channel 15 to interior cavity 48 of gas canister 46.

Gas may be prevented from escaping from gas canister valve 10 around plunger 26 (e.g., as in a typical prior art canister where the exterior port is along the longitudinal axis of gas canister valve 10) by sealing gasket 28. In the example shown, sealing gasket 28 has an approximately U-shaped cross section, with the opening facing toward insert 22 and gas canister 46. Sealing gasket 28 is held in place by seal housing 30 and insert retainer 32. Thus, pressure of gas from the direction of gas canister 46 may tend to widen the opening of sealing gasket 28, thus enhancing the seal preventing the escape of gas around plunger 26. Alternatively or in addition, sealing gaskets having other types of cross sections (e.g., V-shaped, W-shaped, or another shape that enables the gas pressure to enhance the seal, or other shapes), or that are held in place by other mechanisms, may be used.

Figure 3B:
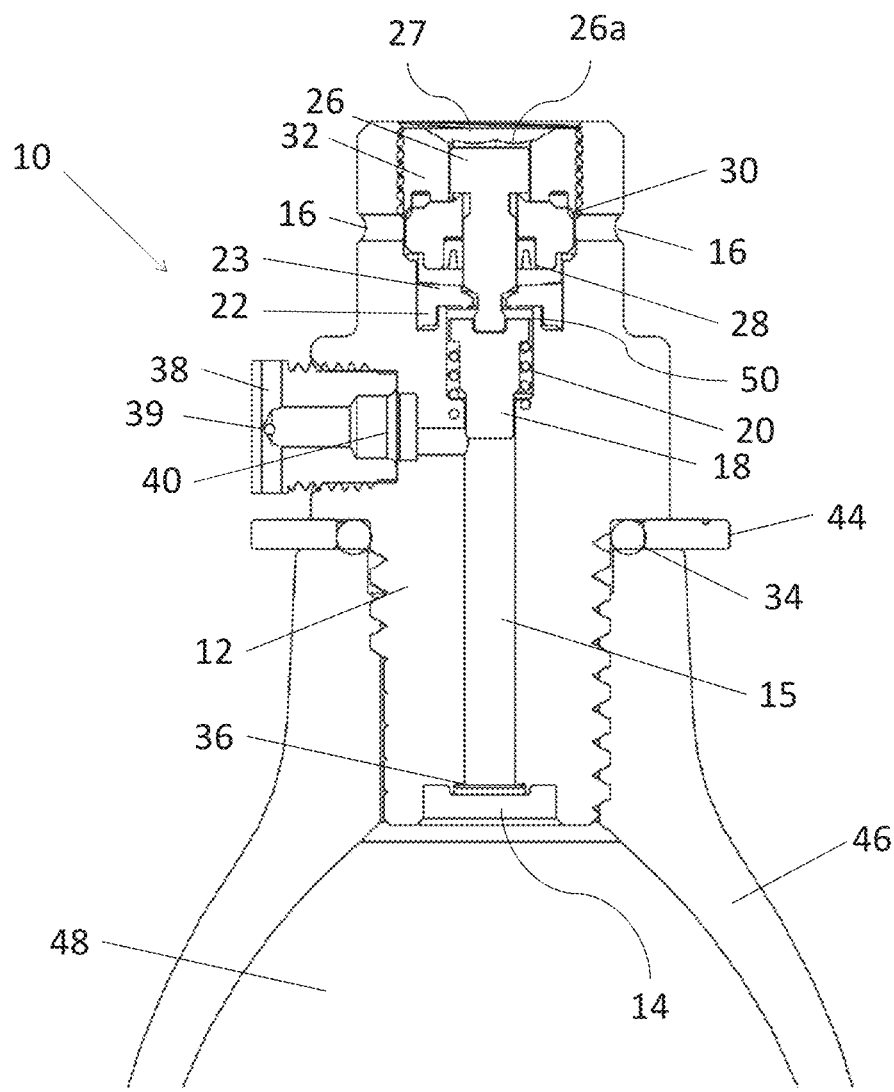
FIG. 3B is a schematic sectional view of the gas canister valve shown in FIG. 1, when the valve is open.

FIG. 3B is a schematic sectional view of the gas canister valve shown in FIG. 1, when the valve is open.

In the example shown, valve poppet 18 has been pushed into gas canister valve 10 and has been separated from valve seating 24 to form gap 50 between valve poppet 18 and insert 22. Accordingly, gas may flow through gap 50 between central channel 15 and exterior ports 16. Gas is prevented from flowing around plunger 26, e.g., between plunger 26 and seal housing 30, by sealing gasket 28. Therefore, gas is constrained to flow between central channel 15 and exterior ports 16, in either direction, via a path that includes grooves 23 and a space between seal housing 30 and valve housing 12.

Gas canister valve 10 may be configured for insertion into one or more types of connectors that do not include threading for holding gas canister valve 10 and gas canister 46 to a canister holder. In addition, a connector for connecting to gas canister valve 10 may be configured to conduct gas to or from laterally oriented exterior ports 16. Accordingly, the connector may be configured to enable lateral flow of gas between exterior ports 16 and a gas conduit (e.g., to the carbonation head of a carbonation machine, or from a gas source of a canister filling system), while preventing the escape of gas in other directions.

The connector may be configured to exert a sufficiently low friction force on gas canister valve 10 to enable insertion of gas canister valve 10 into the connector, and removal of gas canister valve 10 from the connector. On the other hand, the connector is configured, when gas canister valve 10 is inserted into the connector, to enable gas flow between a conduit (e.g., of a carbonation machine or canister filling system) and exterior ports 16.

Figure 4A:
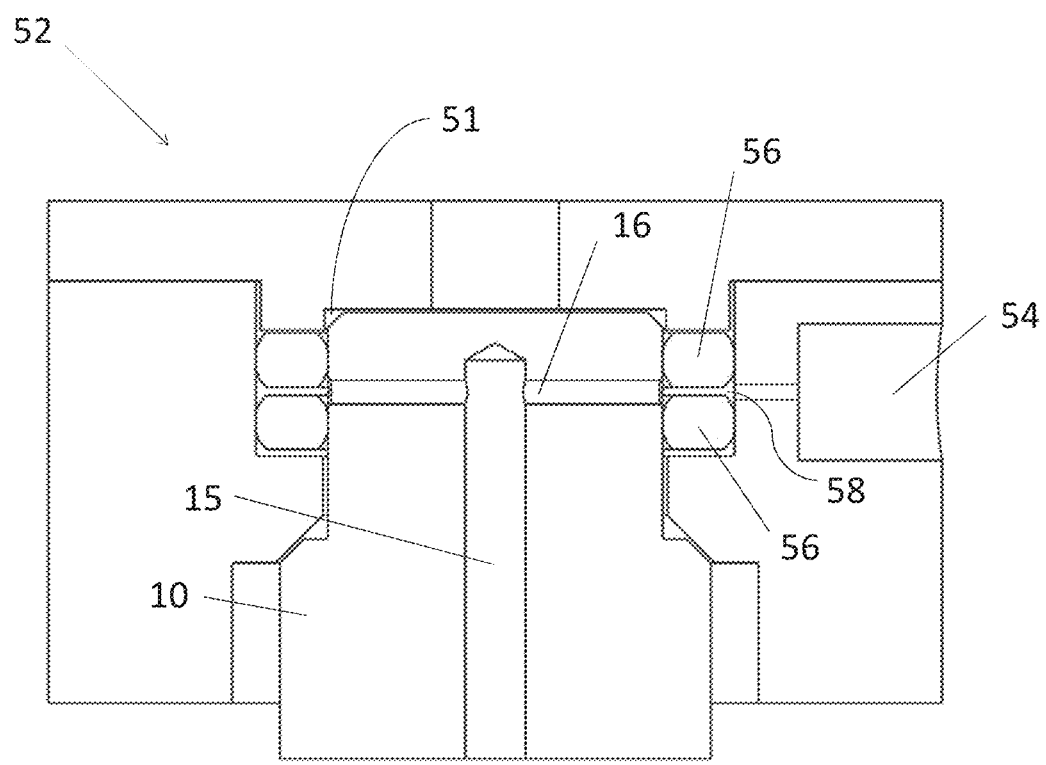
FIG. 4A is a schematic cross section of a connector to a gas canister valve with laterally oriented exterior ports, the connector including a pair of solid gaskets.
Figure 4B:
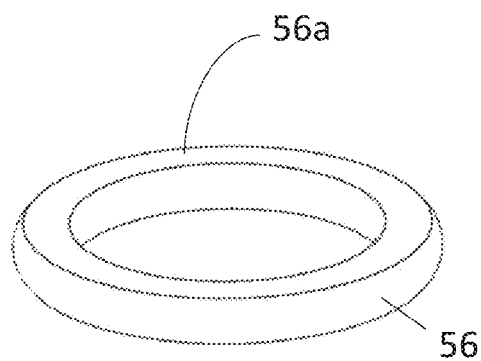
FIG. 4B schematically illustrates a gasket of the connector shown in FIG. 4A.

FIG. 4A is a schematic cross section of a connector to a gas canister valve with laterally oriented exterior ports, the connector including a pair of solid gaskets. FIG. 4B schematically illustrates a gasket of the connector shown in FIG. 4A.

Canister connector 52 is configured to enable insertion of gas canister valve 10. Canister connector 52 is further configured to enable a fluid connection between exterior ports 16 of gas canister valve 10 and gas conduit 54 of canister connector 52. For example, in a canister connector 52 of a carbonation machine, gas conduit 54 may connect canister connector 52 to a carbonation head of the carbonation machine. In a canister connector 52 of a canister filling system, gas conduit 54 may connect canister connector 52 to a gas source of the canister filling system. Although a single gas conduit 54 is shown, other examples of a canister connector may include two or more gas conduits 54.

Canister connector 52 includes a socket 51 that includes sealing structure in the form of a pair of solid gaskets 56 with a gap 58 between the two solid gaskets 56. In the example shown, each solid gasket 56 is in the form of an O-ring with flattened annular faces 56a that border gap 58. In other examples, each gasket may be hollow, or include a full or partial annular bore, or may have an exterior shape that is rectangular or that otherwise differs from that of the example shown.

In the example shown, gas may flow between exterior ports 16 of gas canister valve 10 and gas conduit 54 of canister connector 52 via gap 58 between solid gaskets 56.

Figure 4C:
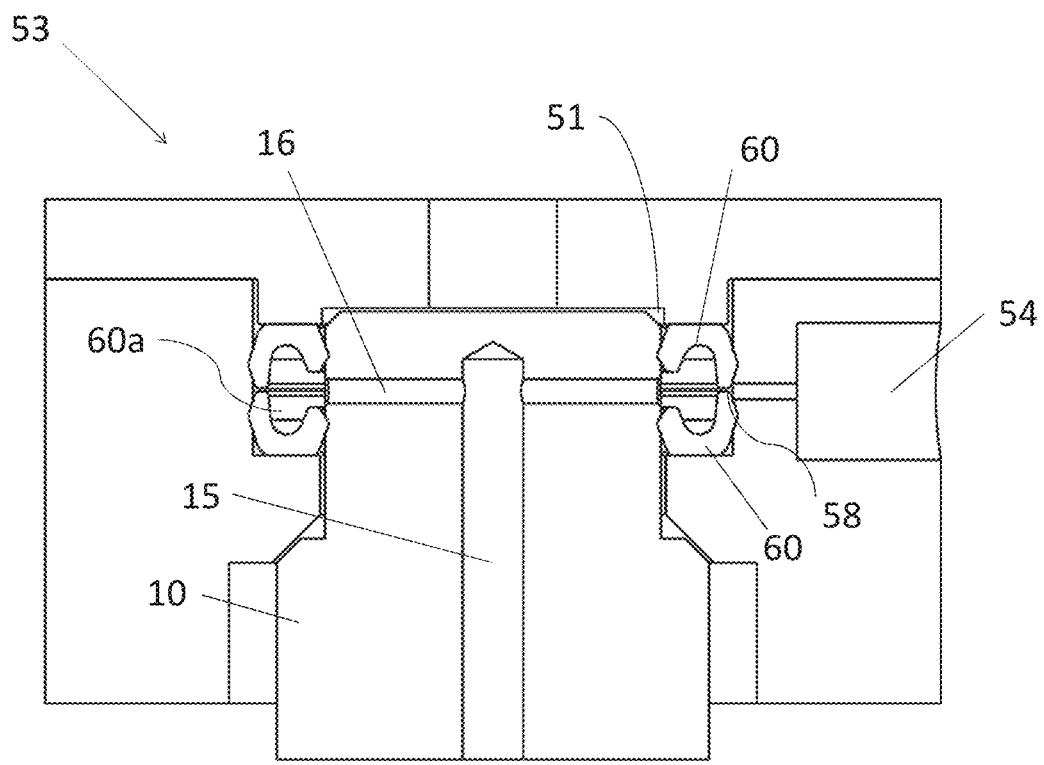
FIG. 4C is a schematic cross section of a connector to a gas canister valve with laterally oriented exterior ports, the connector including a pair of gaskets with U-shaped cross sections.
Figure 4D:
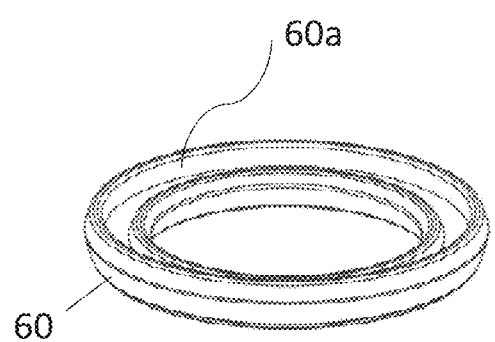
FIG. 4D schematically illustrates a gasket of the connector shown in FIG. 4C.

FIG. 4C is a schematic cross section of a connector to a gas canister valve with laterally oriented exterior ports, the connector including a pair of gaskets with U-shaped cross sections. FIG. 4D schematically illustrates a gasket of the connector shown in FIG. 4C.

Canister connector 53 is configured to enable insertion of gas canister valve 10 and to enable a fluid connection between exterior ports 16 of gas canister valve 10 and gas conduit 54 of canister connector 53.

Canister connector 53 includes a socket 51 that includes sealing structure in the form of a pair of U-shaped gaskets 60. Each U-shaped gasket 60 has a U-shaped cross section that surrounds an opening 60a. In the example shown, one of U-shaped gaskets 60 is inverted relative to the other such that openings 60a of U-shaped gaskets 60 are oriented to face one another. U-shaped gaskets 60 are separated by gap 58.

In the example shown, gas may flow between exterior ports 16 of gas canister valve 10 and gas conduit 54 via gap 58 between U-shaped gaskets 60. The gas may fill openings 60a. Therefore, the pressure of the gas may tend to expand U-shaped gaskets 60 and open openings 60a, thus pressing U-shaped gaskets 60 against surrounding structure to further prevent leakage of the gas.

Figure 5A:
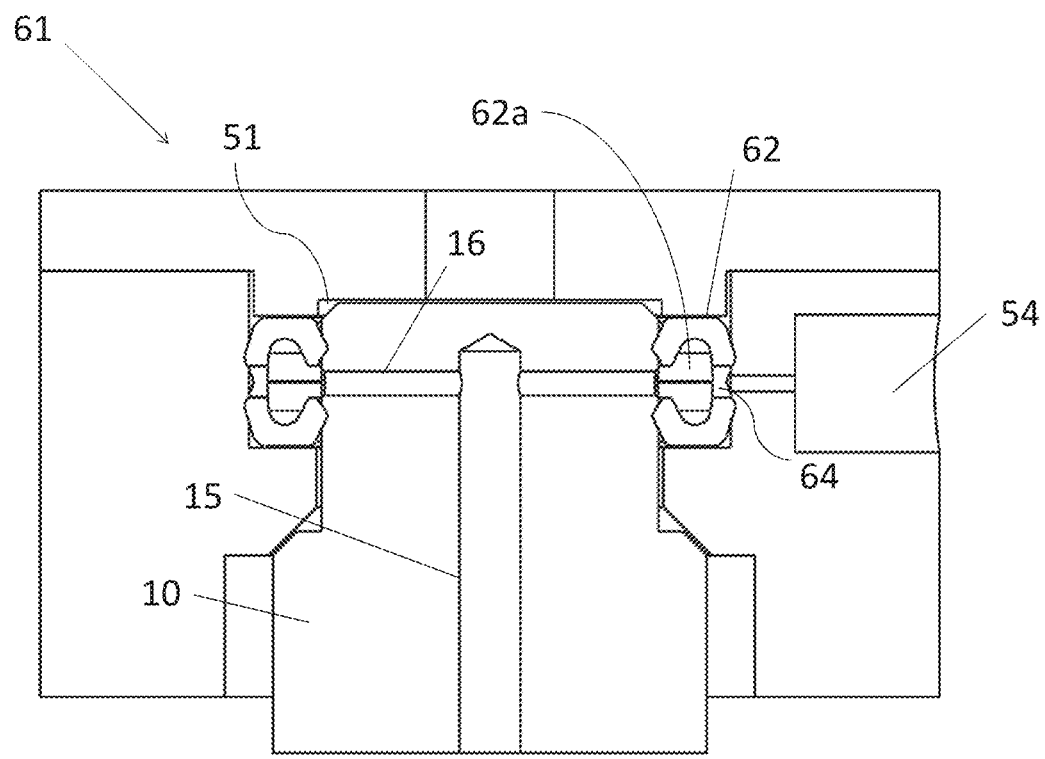
FIG. 5A is a schematic cross section of a connector to a gas canister valve with laterally oriented exterior openings, the connector including an inwardly curved gasket.
Figure 5B:
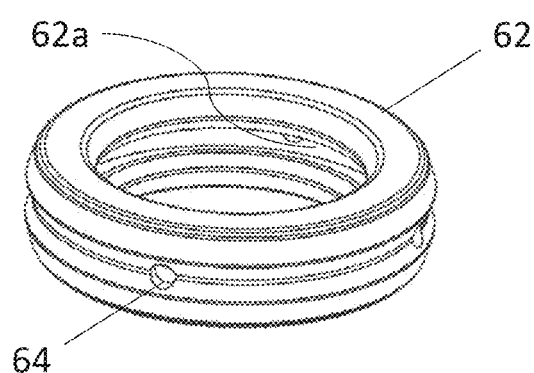
FIG. 5B schematically illustrates a gasket of the connector shown in FIG. 5A.

FIG. 5A is a schematic cross section of a connector to a gas canister valve with laterally oriented exterior openings, the connector including an inwardly curved gasket. FIG. 5B schematically illustrates a gasket of the connector shown in FIG. 5A.

Canister connector 61 is configured to enable insertion of gas canister valve 10 and to enable a fluid connection between exterior ports 16 of gas canister valve 10 and gas conduit 54 of canister connector 61.

Canister connector 61 includes a socket 51 that includes sealing structure in the form of a single U-shaped (or C-shaped) gasket 62. U-shaped gasket 62 has a U-shaped cross section that surrounds an opening 62a. Opening 62a of U-shaped gasket 62. opens inward, toward the axis of symmetry of U-shaped gasket 62. The outward facing convex surface of U-shaped gasket 62 is perforated by exterior opening holes 64. In the example shown, U-shaped gasket 62 includes four evenly spaced exterior opening holes 64. In other examples, a U-shaped gasket 62 may include less than or more than four exterior opening holes 64.

In the example shown, gas may flow between exterior ports 16 of gas canister valve 10 and gas conduit 54 of canister connector 61 via exterior opening holes 64 in U-shaped gasket 62. The gas may fill opening 62a. Therefore, the pressure of the gas may tend to expand U-shaped gasket 62 to further open opening 62a, pressing U-shaped gasket 62 against surrounding structure to further prevent leakage of the gas.

Figure 5C:
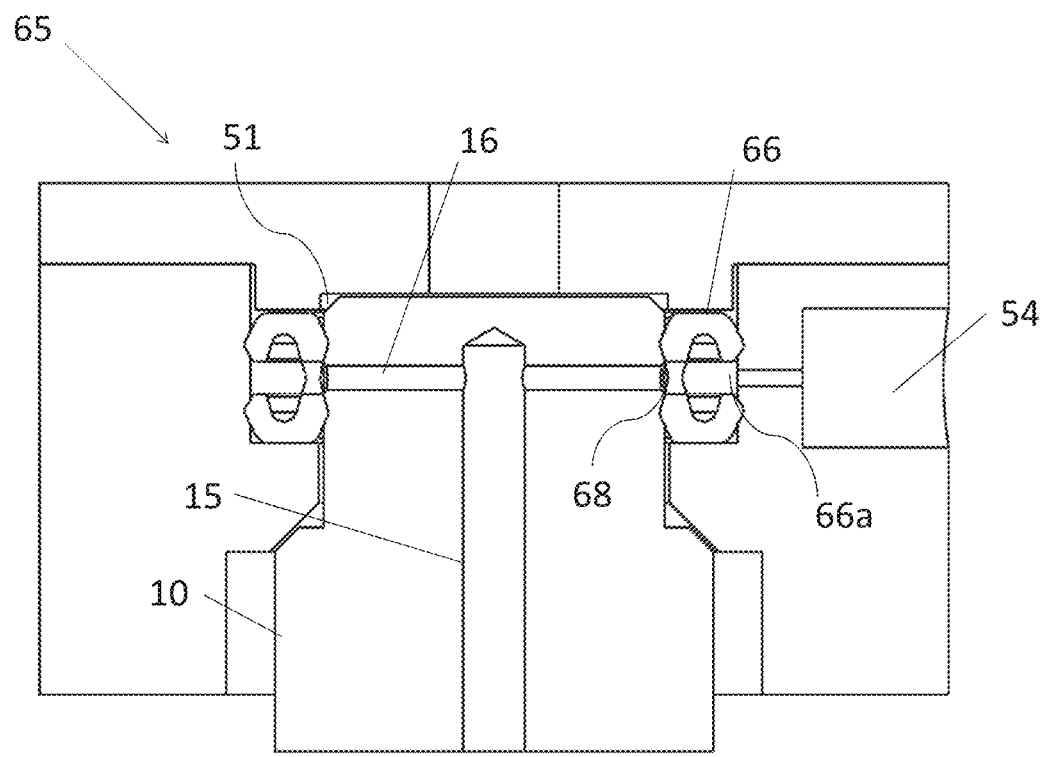
FIG. 5C is a schematic cross section of a connector to a gas canister valve with laterally oriented interior openings, the connector including an outwardly curved gasket.
Figure 5D:
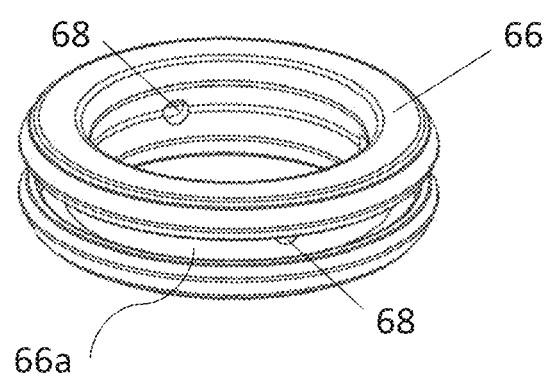
FIG. 5D schematically illustrates a gasket of the connector shown in FIG. 5C.

FIG. 5C is a schematic cross section of a connector to a gas canister valve with laterally oriented interior openings, the connector including an outwardly curved gasket. FIG. 5D schematically illustrates a gasket of the connector shown in FIG. 5C.

Canister connector 65 is configured to enable insertion of gas canister valve 10 and to enable a fluid connection between exterior ports 16 of gas canister valve 10 and gas conduit 54 of canister connector 65.

Canister connector 65 includes a socket 51 that includes sealing structure in the form of a single U-shaped (or C-shaped) gasket 66. U-shaped gasket 66 has a U-shaped cross section that surrounds an opening 66a. Opening 66a of U-shaped gasket 66 opens outward, away from the axis of symmetry of U-shaped gasket 66. The inward facing convex surface of U-shaped gasket 66 is perforated by interior opening holes 68. In the example shown, U-shaped gasket 66 includes four evenly spaced interior opening holes 68. In other examples, a U-shaped gasket 66 may include less than or more than four interior opening holes 68.

In the example shown, gas may flow between exterior ports 16 of gas canister valve 10 and gas conduit 54 of canister connector 65 via interior opening holes 68 in U-shaped gasket 66. The gas may fill opening 66a. Therefore, the pressure of the gas may tend to expand U-shaped gasket 66 to further open opening 66a, pressing U-shaped gasket 66 against surrounding structure to further prevent leakage of the gas.

A canister holder may be provided with structure to hold an inserted gas canister 46. In particular, the structure may be configured to engage structure that projects outward from gas canister 46, gas canister valve 10, or both. The outwardly projecting structure may include a circular or otherwise shaped disk 44. In some cases, disk 44 may be constructed in the form of a washer that is held between gas canister valve 10 and gas canister 46 when gas canister valve 10 is attached to, typically screwed into, gas canister 46.

Figure 6:
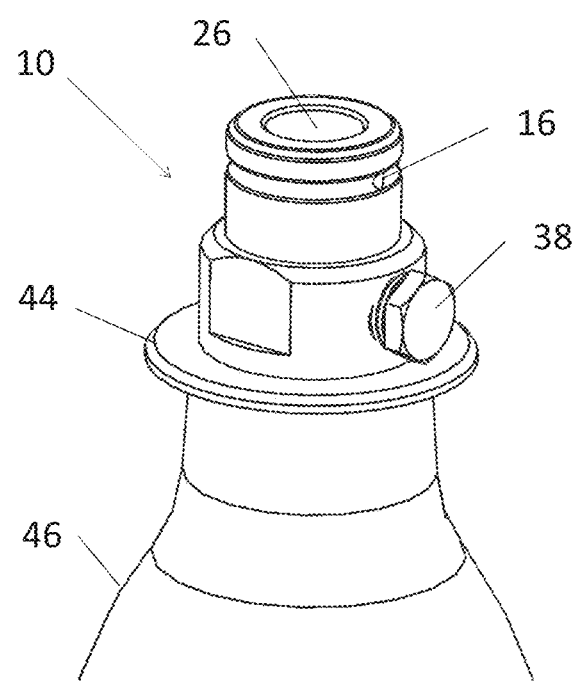
FIG. 6 schematically illustrates a gas canister and gas canister valve with a circular projecting disk.

FIG. 6 schematically illustrates a gas canister and gas canister valve with a circular projecting disk.

In the example shown, disk 44 is circular and held between gas canister 46 and gas canister valve 10.

Figure 7A:
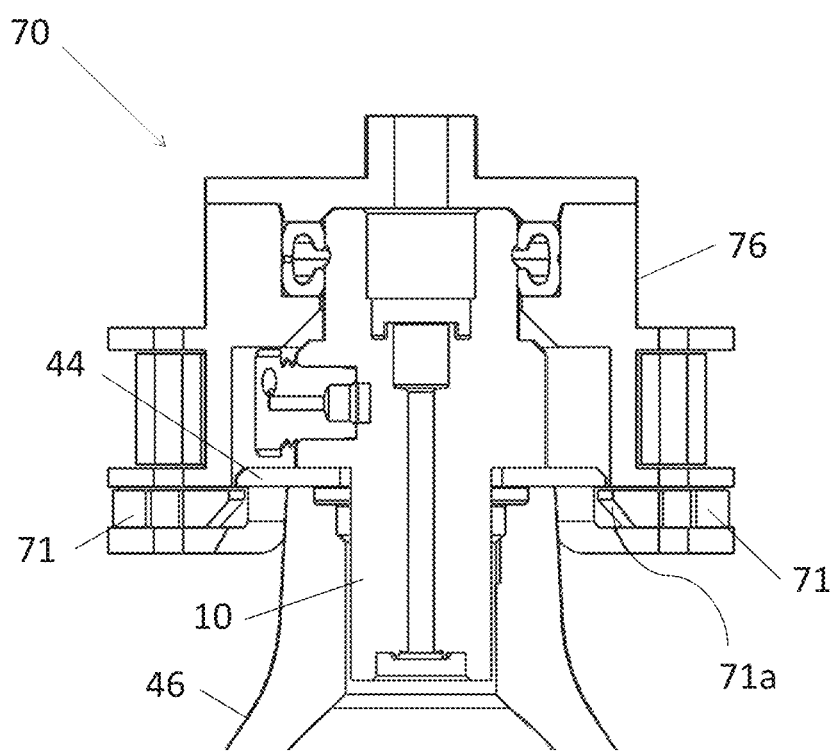
FIG. 7A shows a schematic cross section of a snap-in canister holder for holding the gas canister shown in FIG. 6.

FIG. 7A shows a schematic cross section of a snap-in canister holder for holding the gas canister shown in FIG. 6.

In the example shown, canister holder 70 is configured to enable insertion of a gas canister by pressing an exterior end of gas canister valve 10 (an end distal to gas canister 46) upward toward and into canister connector 76. Although in FIG. 7 canister connector 76 is shown having a form similar to canister connector 61 (with a U-shaped gasket 62), canister connector 76 may have a form similar to any of the canister connectors described above, or another type of canister connector.

Canister holder 70 includes at least two slidable teeth 71. A resilient spring or other element (not shown) is configured to push each slidable tooth 71 inward, toward one another. Each slidable tooth 71 has a sloped surface 71a that faces outward from canister holder 70. Therefore, when a gas canister 46 with a disk 44 is pushed into (upward in FIG. 7) canister holder 70, disk 44 may push against sloped surface 71a and cause each slidable tooth 71 to slide outward. The outward sliding of slidable teeth 71 may enable insertion of gas canister valve 10 into canister connector 76. Once disk 44 has been inserted past slidable teeth 71, the resilient element may push slidable teeth 71 inward. The inward position of slidable teeth 71 may prevent outward movement of disk 44, thus holding gas canister 46 to canister holder 70. The position of slidable teeth 71 may be selected such that, when slidable teeth 71 slide inward after passage of disk 44, gas canister valve 10 may be fully inserted into canister connector 76. A circular shape of disk 44 may enable insertion of gas canister 46 without having to hold gas canister 46 in a particular orientation (about its longitudinal axis).

Figure 7B:
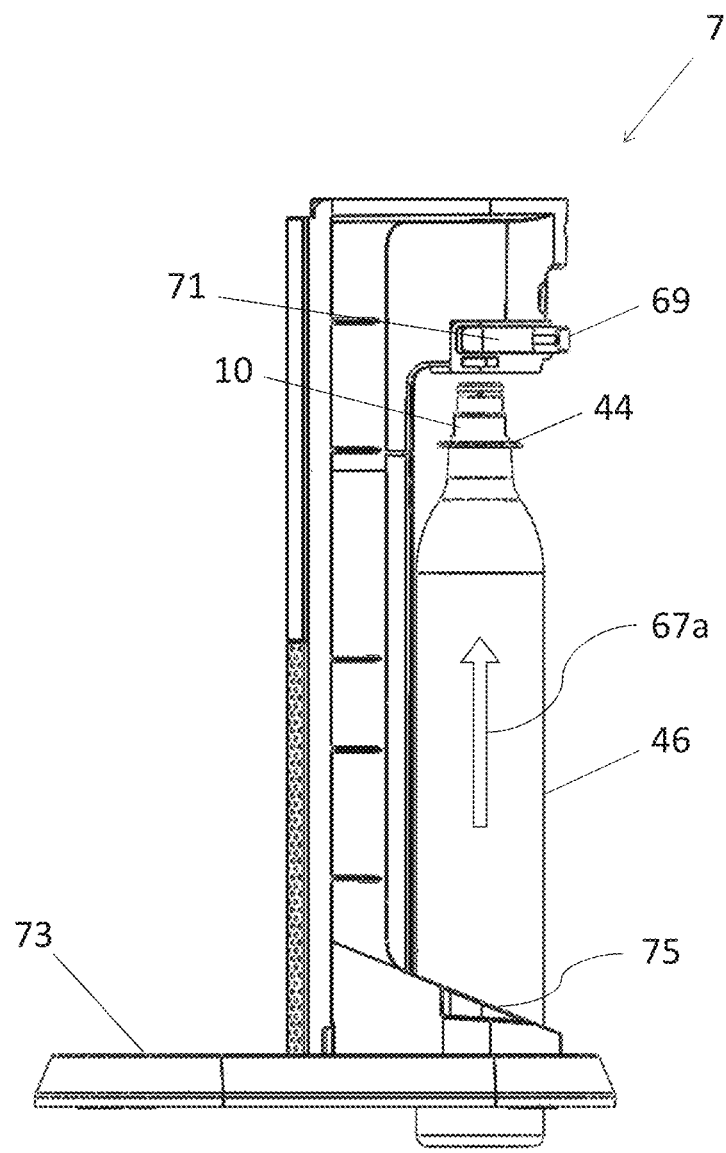
FIG. 7B schematically illustrates insertion of a canister into the snap-in canister holder shown in 7A.

FIG. 7B schematically illustrates insertion of a canister into the snap-in canister holder shown in FIG. 7A.

In the example shown, gas canister valve 10 of gas canister 46 may be inserted into canister connector 76 by moving gas canister valve 10 toward canister connector 76 with upward motion 67a. As gas canister valve 10 is inserted into canister connector 76, slidable teeth 71 may be pushed outward by disk 44. When gas canister valve 10 is fully inserted into canister connector 76, slidable teeth 71 may snap inward below disk 44 to secure disk 44, and thus gas canister 46, within canister holder 70.

In the example shown, canister holder base 73 (e.g., of a carbonation machine or of a canister filling system) includes an opening 75. Thus, gas canister 46 may be inserted so that the longitudinal axis of gas canister 46 and of gas canister valve 10 is aligned with upward motion 67a, with a lower end of gas canister 46 extending downward through opening 75. Accordingly, gas canister 46 need only be translated parallel to upward motion 67a (e.g., without rotation of gas canister 46) in order to insert gas canister valve 10 into canister connector 76.

Figure 7C:
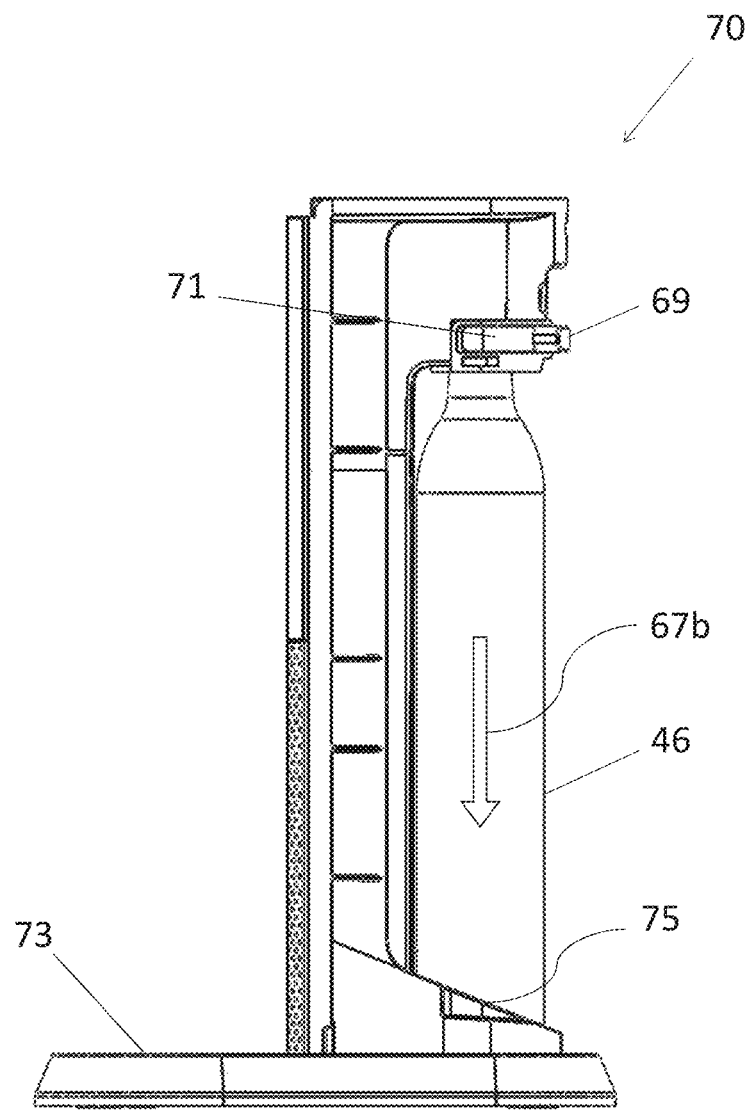
FIG. 7C schematically illustrates removal of a canister from the snap-in canister holder shown in FIG. 7A.

FIG. 7C schematically illustrates removal of a canister from the snap-in canister holder shown in FIG. 7A.

In the example shown, disk 44 is secured to canister holder 70 by slidable teeth 71. In order to enable removal of gas canister 46 from canister holder 70, release mechanism 69 may be operated to cause outward retraction of slidable teeth 71 to enable downward movement of disk 44 past slidable teeth 71. For example, release mechanism 69 may include a pushbutton, lever, or other user operable component that, when operated, causes slidable teeth 71 to be retracted outward. When slidable teeth 71 are retracted, gas canister 46 may be removed from canister holder 70 by moving gas canister valve 10 away from canister connector 76 with downward motion 67b.

Canister holder 70 may include a retraction mechanism that is operable by a user, e.g., by pressing a button or lever, to retract slidable teeth 71 to enable removal of gas canister 46 from canister holder 70.

Alternatively or in addition, a mechanism for holding a gas canister 46 in a canister holder may be configured to cooperate with a noncircular asymmetric disk that is elongated along one axis.

Figure 8A:
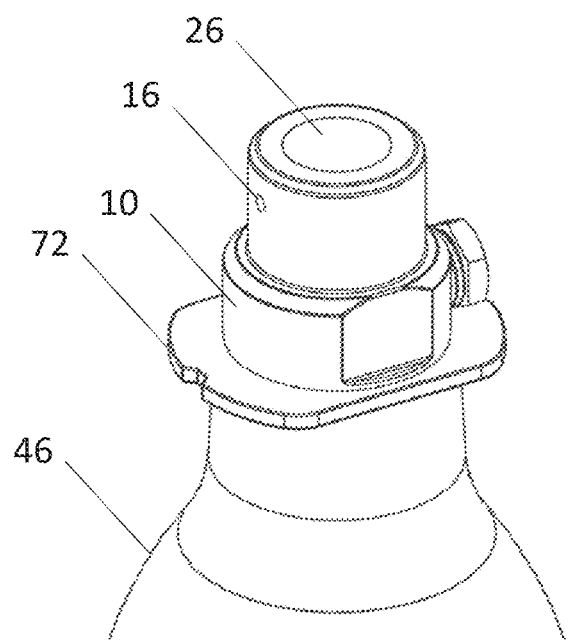
FIG. 8A schematically illustrates a gas canister and gas canister valve with a noncircular lateral projection.

FIG. 8A schematically illustrates a gas canister and gas canister valve with a noncircular lateral projection.

In the example shown, noncircular lateral projection 72 is held between gas canister 46 and gas canister valve 10. In the example shown, noncircular lateral projection 72 has the form of doubly truncated circle. In other examples, a noncircular lateral projection may have another noncircular shape.

Figure 8B:
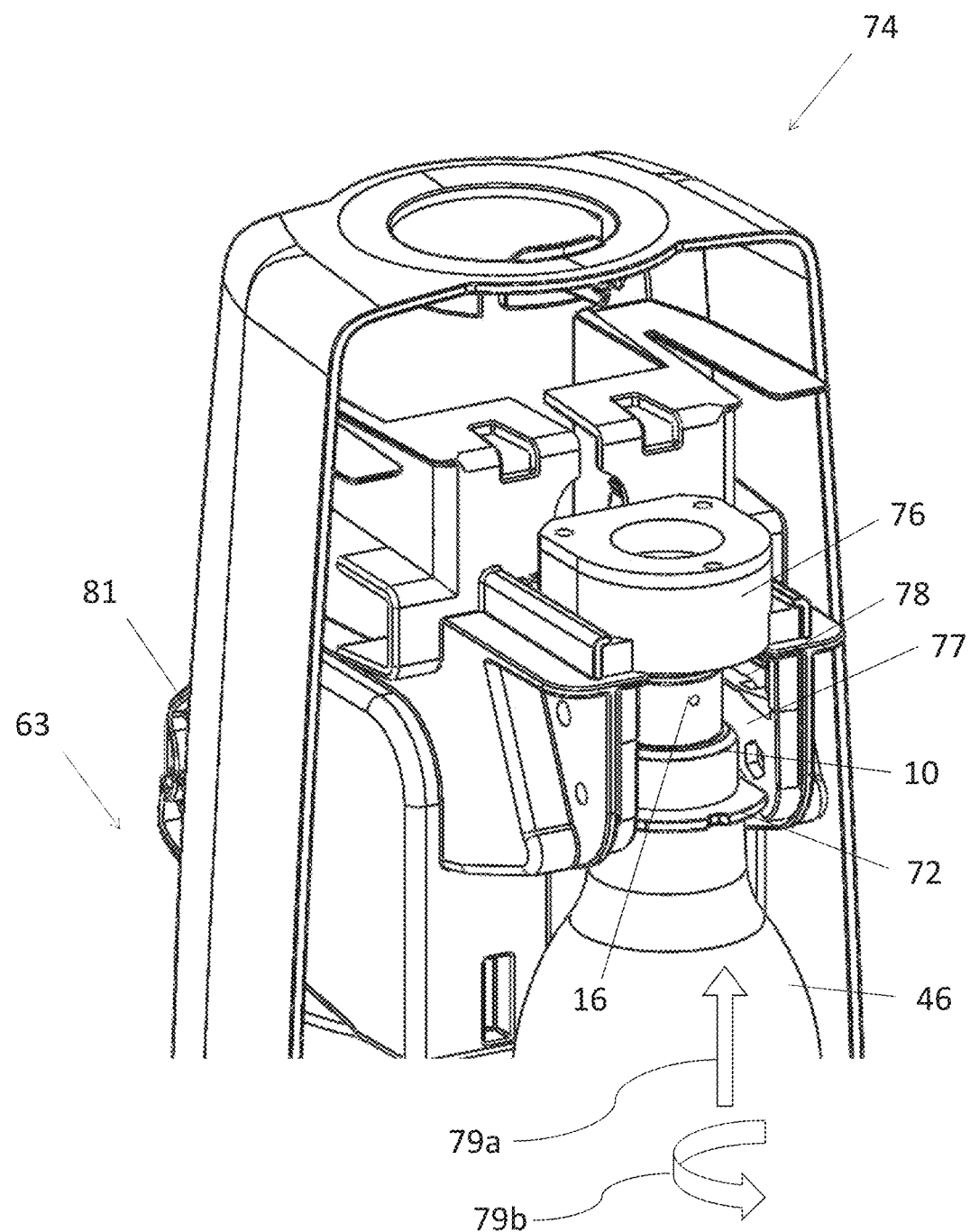
FIG. 8B schematically illustrates insertion of the gas canister shown in FIG. 8A into a canister holder of a carbonation machine.

FIG. 8B schematically illustrates insertion of the gas canister shown in FIG. 8A into a canister holder of a carbonation machine.

In the example shown, noncircular lateral projection 72 is in the form of a doubly truncated circle. In other examples, noncircular lateral projection 72 may have any form that is not circularly symmetric. For example, noncircular lateral projection 72 may have a polygonal, oval, or other noncircular shape.

In the example shown, carbonation machine 63 includes a carbonation head 81 and canister holder 74. Canister holder 74 includes a yoke 78 with an elongated opening 77. When the long dimension of noncircular lateral projection 72 on gas canister 46 is aligned with elongated opening 77 of yoke 78, gas canister 46 may be moved with linear motion 79a until gas canister valve 10 is inserted into canister connector 76.

When gas canister valve 10 has been inserted into canister connector 76, gas canister 46 may be rotated about its axis with rotation motion 79b (or with an opposite rotation). Rotation of gas canister 46 may rotate noncircular lateral projection 72 by a sufficient angle such that noncircular lateral projection 72 is no longer aligned with elongated opening 77. When so rotated, yoke 78 may prevent outward motion (e.g., in the direction opposite to linear motion 79a) of noncircular lateral projection 72. Thus, gas canister 46 and gas canister valve 10 may be locked within canister holder 74 and canister connector 76.

In other examples, e.g., where a noncircular lateral projection has another shape, an opening of the yoke may be shaped to match the shape of the noncircular lateral projection. Thus, when the noncircular lateral projection is aligned with the opening, the noncircular lateral projection may be inserted into the opening. After insertion, gas canister 46 and the noncircular lateral projection may be rotated such that the opening and the noncircular lateral projection are no longer aligned. Therefore, after such rotation, the noncircular lateral projection and the attached gas canister 46 cannot be removed from the yoke.

Figure 8C:
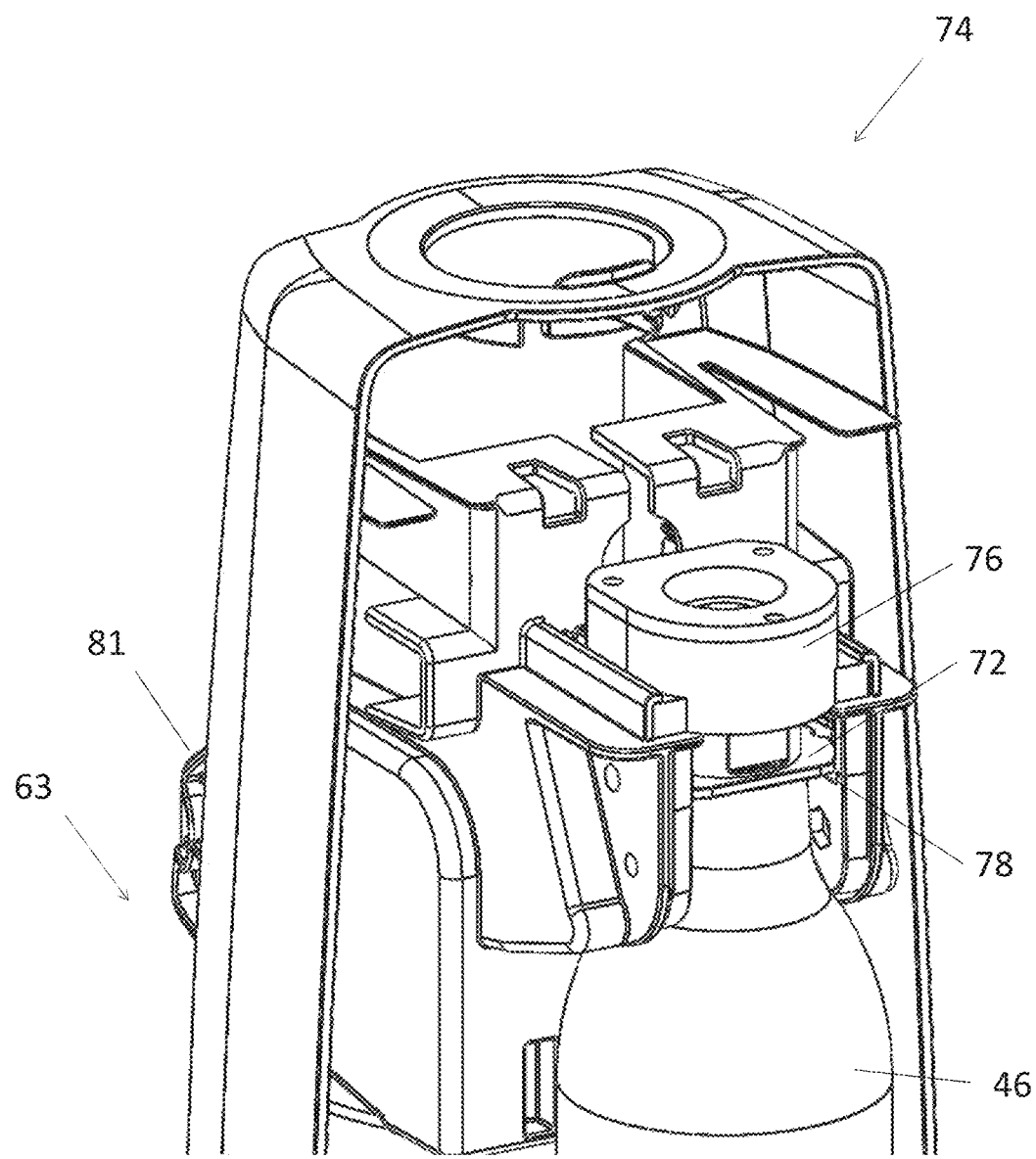
FIG. 8C schematically illustrates a gas canister locked in the canister holder shown in FIG. 8B.

FIG. 8C schematically illustrates a gas canister locked in the canister holder shown in FIG. 8B.

As shown in FIG. 8C, noncircular lateral projection 72 has been rotated with rotation motion 79b (or its opposite) by approximately 90° such that the long dimension of noncircular lateral projection 72 is approximately perpendicular to that of elongated opening 77. Thereby, gas canister 46 is locked within canister holder 74. In order to enable removal of gas canister 46 from canister holder 74, gas canister 46 may be rotated until the long dimension of noncircular lateral projection 72 is aligned with that of elongated opening 77. When so aligned, gas canister 46 may be removed from canister holder 74 by Mulling gas canister 46 in a direction opposite to that of linear motion 79a.

In some examples, a canister holder may be configured to lift gas canister 46 when gas canister 46 is closed into the canister holder. The closing mechanism may include, for example, a handle (e.g., functioning as a door or other cover) that, in some examples, may at least partially cover a cavity into which gas canister 46 is insertable, a tillable cradle into which gas canister 46 is insertable, or a base on which gas canister 46 may stand.

Figure 9A:
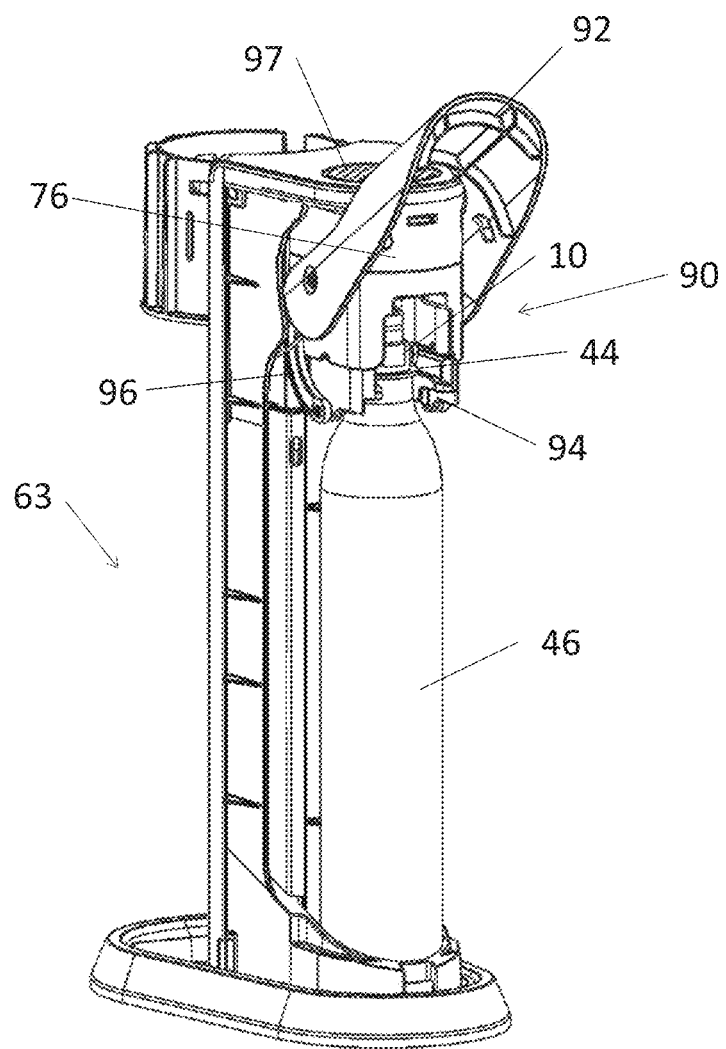
FIG. 9A schematically illustrates an example of a carbonation machine with canister holder having a closable cover configured to raise the canister into position when closed.
Figure 9B:
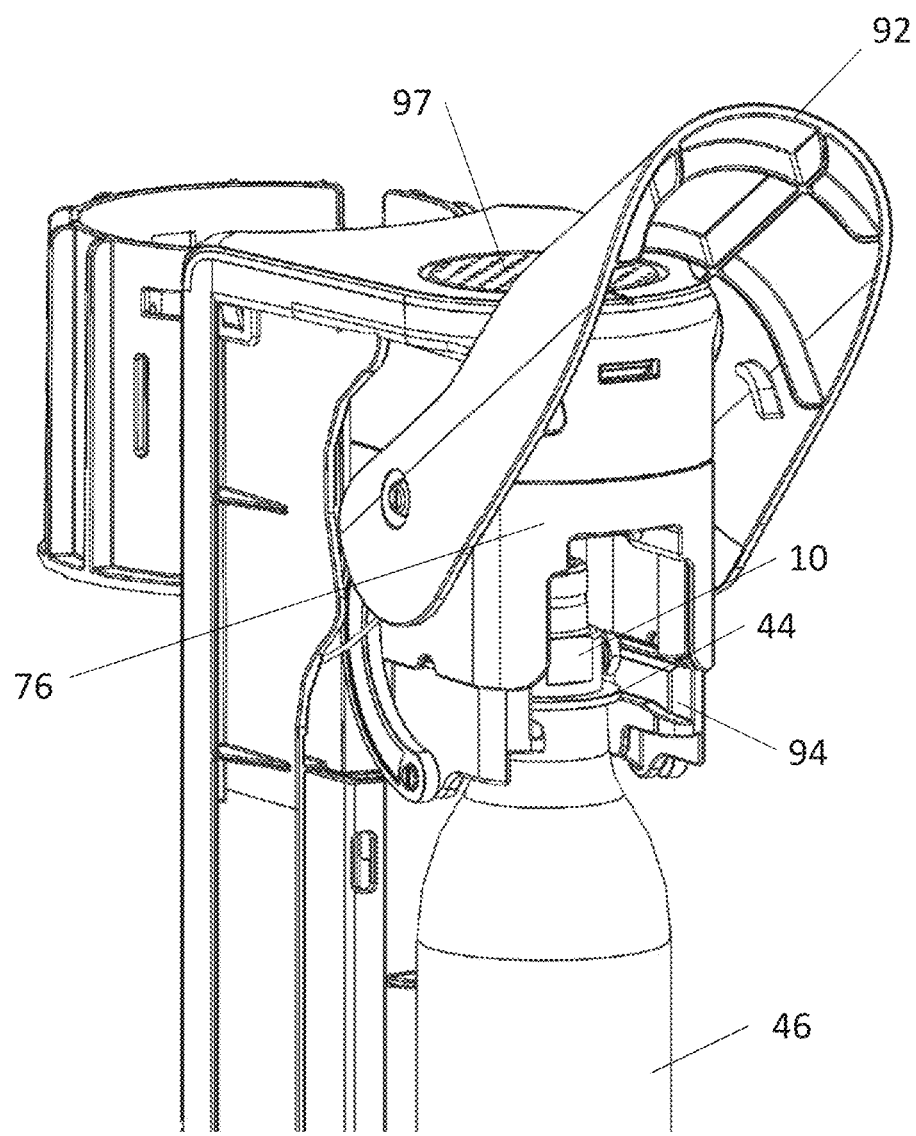
FIG. 9B schematically illustrates details of the lifting mechanism of the canister holder shown in FIG. 9A.

FIG. 9A schematically illustrates a carbonation machine with a canister holder having a closable cover configured to raise the canister into position when closed. FIG. 9B schematically illustrates details of the lifting mechanism of the canister holder shown in FIG. 9A.

When gas canister 46 with disk 44 (which may be circular, or may have a rectangular or other polygonal shape, an oval shape, or another shape) is inserted into canister holder 90 of carbonation machine 63, disk 44 may fit above, and may be held by, yoke 94. Canister cover 92 is connected to yoke 94 by hinged lever mechanism 96 (or by another mechanism, e.g., that includes one or more hinges, levers, gears, pulleys, or other mechanical components, that links motion of yoke 94 to that of canister cover 92). Thus, when canister cover 92 is rotated downward and inward (e.g., toward gas canister 46) to cover gas canister 46, yoke 94 is lifted toward canister connector 76. When canister cover 92 is fully closed, gas canister valve 10 may be fully inserted into canister connector 76. When fully inserted, a user operating gas release control 97 (e.g., a pushbutton as in the example shown, or another user-operable control) to cause an activation mechanism to operate gas canister valve 10 to release gas from gas canister 46.

Figure 9C:
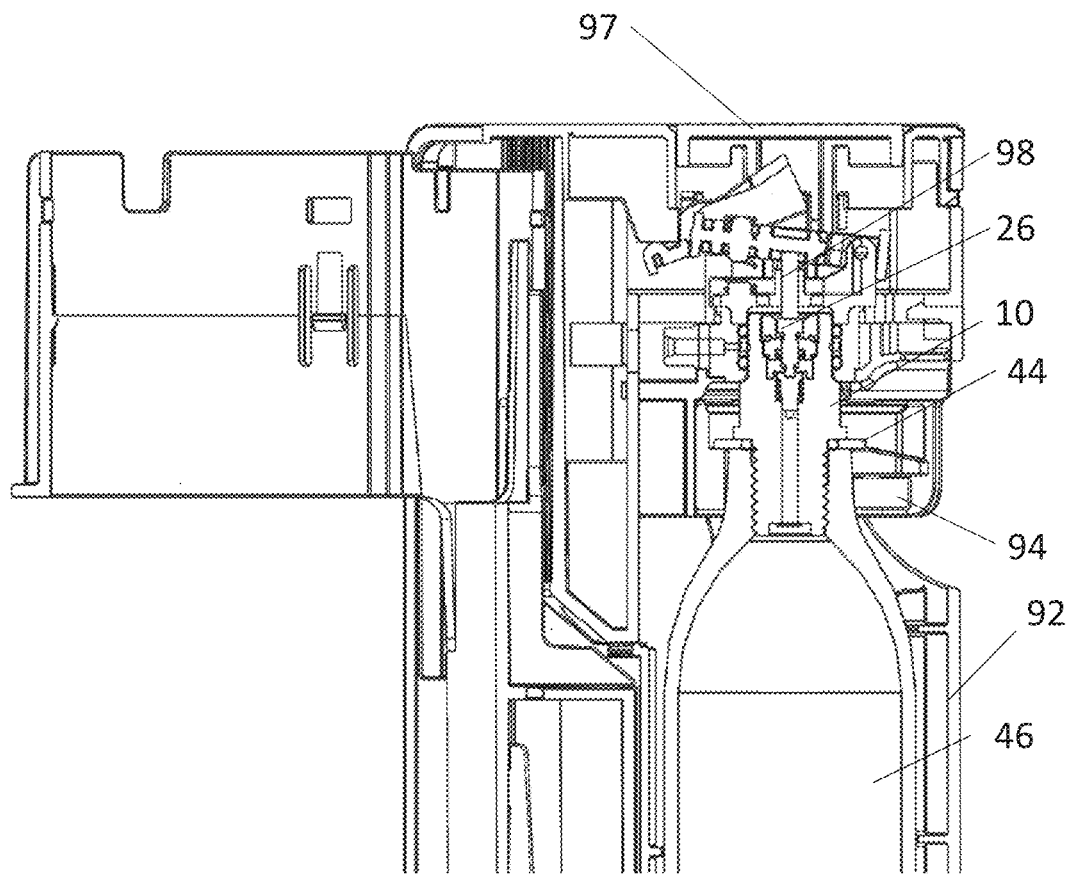
FIG. 9C is a schematic sectional view of the canister holder shown in FIG. 9B, with the cover closed.

FIG. 9C is a schematic sectional view of the canister holder shown in FIG. 9B, with the cover closed.

With canister cover 92 fully closed, gas canister valve 10 is fully inserted into canister connector 76. In the example shown, activation rod 98 is positioned adjacent to plunger 26 of gas canister valve 10. In the example shown, when gas release control 97 is pressed, an activation mechanism pushes activation rod 98 against plunger 26. Continued pushing on activation rod 98 and plunger 26 may open gas canister valve 10 to release gas from gas canister 46 via exterior ports into gas conduit of canister connector 76.

Figure 10A:
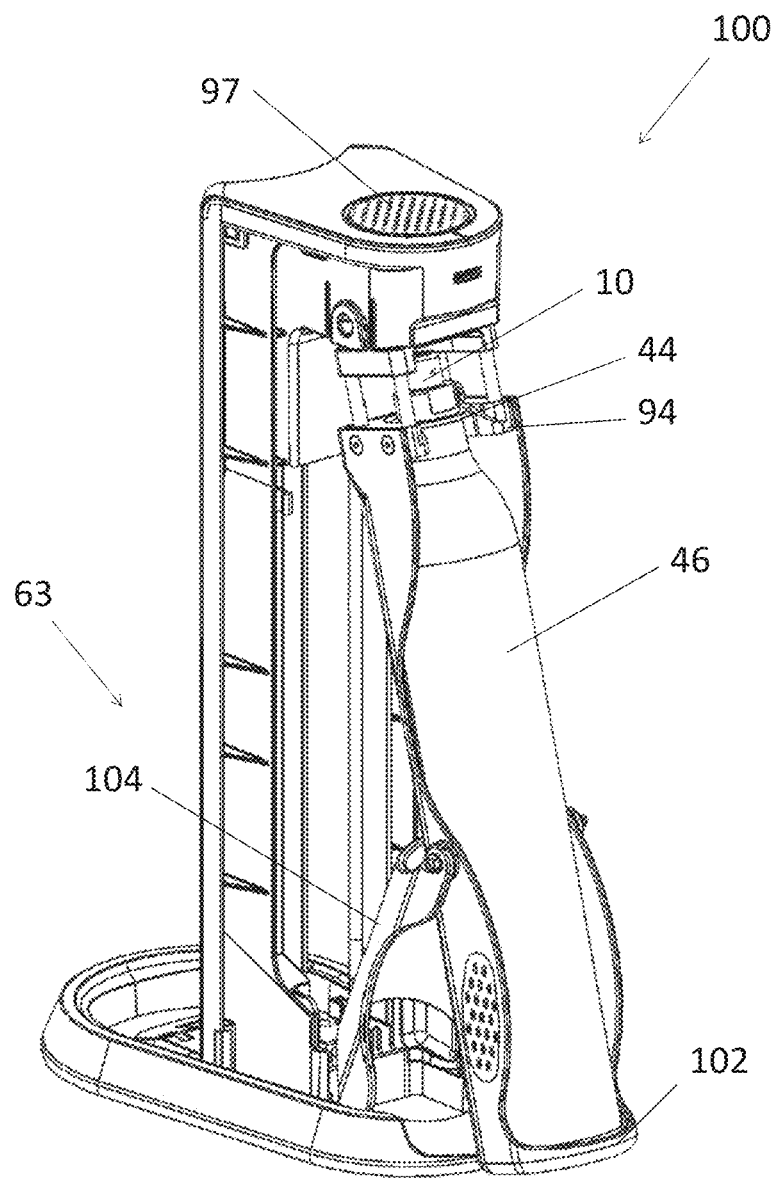
FIG. 10A schematically illustrates a canister holder of a carbonation machine with a tillable canister cradle that is configured to raise the canister into position when closed.

FIG. 10A schematically illustrates a canister holder of a carbonation machine with a tiltable canister cradle that is configured to raise the canister into position when closed.

A gas canister 46 with disk 44 (which may be circular, or may have a rectangular or other polygonal shape, an oval shape, or another shape) may inserted into, or removed from, canister cradle 102 of canister holder 100 of carbonation machine 63 when canister cradle 102 is tilted outward, as shown. Disk 44 of an inserted gas canister 46 may fit over yoke 94. It may be noted that, in the example shown, the function of disk 44 and yoke 94 may be to guide gas canister 46 to a correct position on canister cradle 102. In other examples, canister cradle 102, gas canister 46, or both may have other structure for guiding placement of gas canister 46 in canister cradle 102.

Canister cradle 102 is connected to stationary structure of canister holder 100 by hinged lever mechanism 104 (or by another mechanism, e.g., that includes one or more hinges, levers, gears, pulleys, or other mechanical components). Therefore, when a gas canister 46 is inserted into canister cradle 102 and canister cradle 102 is rotated inward (so as to tilt gas canister 46 upward until it is erect), canister cradle 102 and gas canister 46 are lifted toward canister connector 76.

Figure 10B:
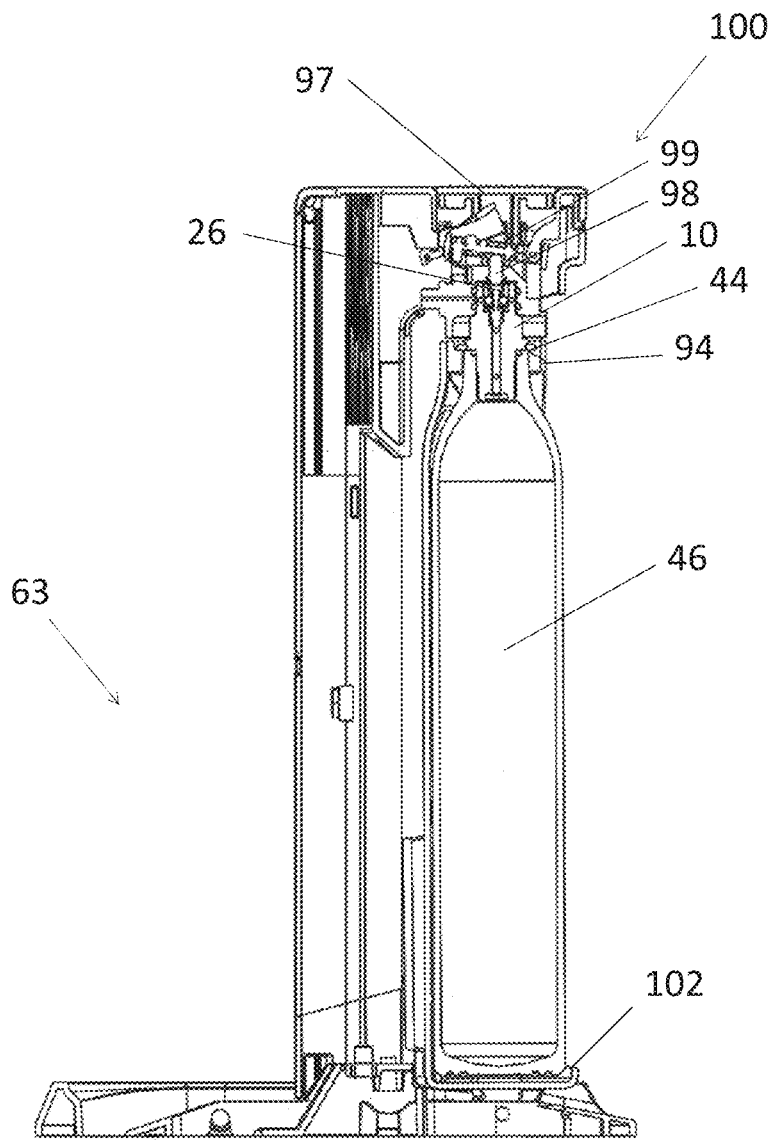
FIG. 10B is a schematic sectional view of the canister holder shown in FIG. 10A, with the canister cradle fully inserted.

FIG. 10B is a schematic sectional view of the canister holder shown in FIG. 10A, with the canister cradle fully inserted.

As shown, canister cradle 102 and gas canister 46 have been tilted inward and are erect. Gas canister valve 10 is fully inserted into canister connector 76 to enable operation of gas canister valve 10 by operation of gas release control 97, activation mechanism 99, and activation rod 98.

Figure 11A:
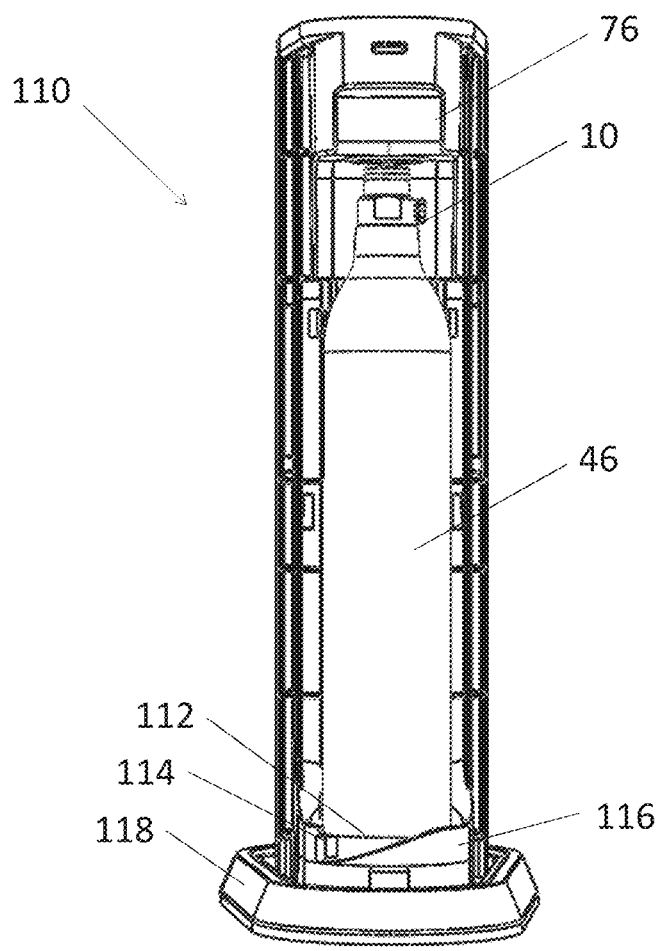
FIG. 11A schematically illustrates a canister holder that includes a base that is configured to raise a gas canister into position when rotated, the canister holder shown in a configuration that enables insertion or removal of a canister.

FIG. 11A schematically illustrates a canister holder that includes a base that is configured to raise a gas canister into position when rotated, the canister holder shown in a configuration that enables insertion or removal of a canister.

Base 118 of canister holder 110 (e.g., of a carbonation machine or of a canister filling system) includes canister support platform 112. When in the configuration shown, canister support platform 112 is sufficiently low such that a gas canister 46 with its gas canister valve 10 may fit between canister support platform 112 and canister connector 76. In this configuration, gas canister 46 may be inserted into canister holder 110 or removed from canister holder 110.

Canister support platform 112 may be rotated in order to lift gas canister 46 such that gas canister valve 10 is inserted into canister connector 76. In the example shown, canister support platform 112 may be rotated such that tab 114 on canister support platform 112 climbs incline 116 on base 118. Therefore, rotating canister support platform 112 such that tab 114 is rotated toward the uppermost part of incline 116 may lift gas canister 46 and gas canister valve 10 such that gas canister valve 10 is inserted into canister connector 76.

Figure 11B:
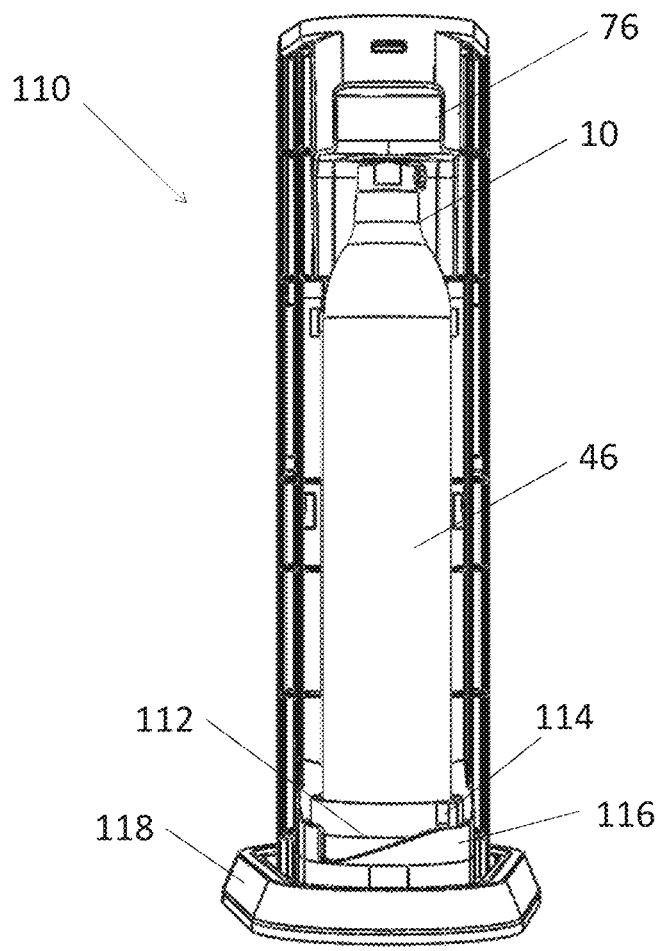
FIG. 11B schematically illustrates a canister holder shown in FIG. 11A when in a configuration in which a canister is locked into an operating position.

FIG. 11B schematically illustrates a canister holder shown in FIG. 11A when in a configuration in which a canister is locked into an operating position.

When, as in the example shown, gas canister valve 10 is inserted into canister connector 76, the space between canister support platform 112 and canister holder 110 has been decreased such that gas canister 46 cannot be removed from canister holder 110. Rotation of gas canister 46 such that tab 114 is rotated back toward the lowermost part of incline 116 may lower canister support platform 112 such that the space between canister support platform 112 and canister connector 76 is sufficiently large to enable removal of gas canister 46 and gas canister valve 10 from canister connector 76. In some cases, base 118 may include structure to prevent accidental or unintentional lowering of canister support platform 112. For example, base 118 may include a latch or other structure that is configured to hold tab 114 at the uppermost part of incline 116 until a release (e.g., an unlatching) mechanism is operated.

Canister holder 110 may include one or more other structures to secure an inserted gas canister 46. For example, when gas canister 46 includes a disk 44, canister holder 110 may include slidable teeth 71 or other structure to hold disk 44 in place. When gas canister 46 includes a noncircular lateral projection 72, canister holder 110 may include a yoke 78 with an elongated opening 77. A canister holder 110 may include other types of securing structure.

Figure 12A:
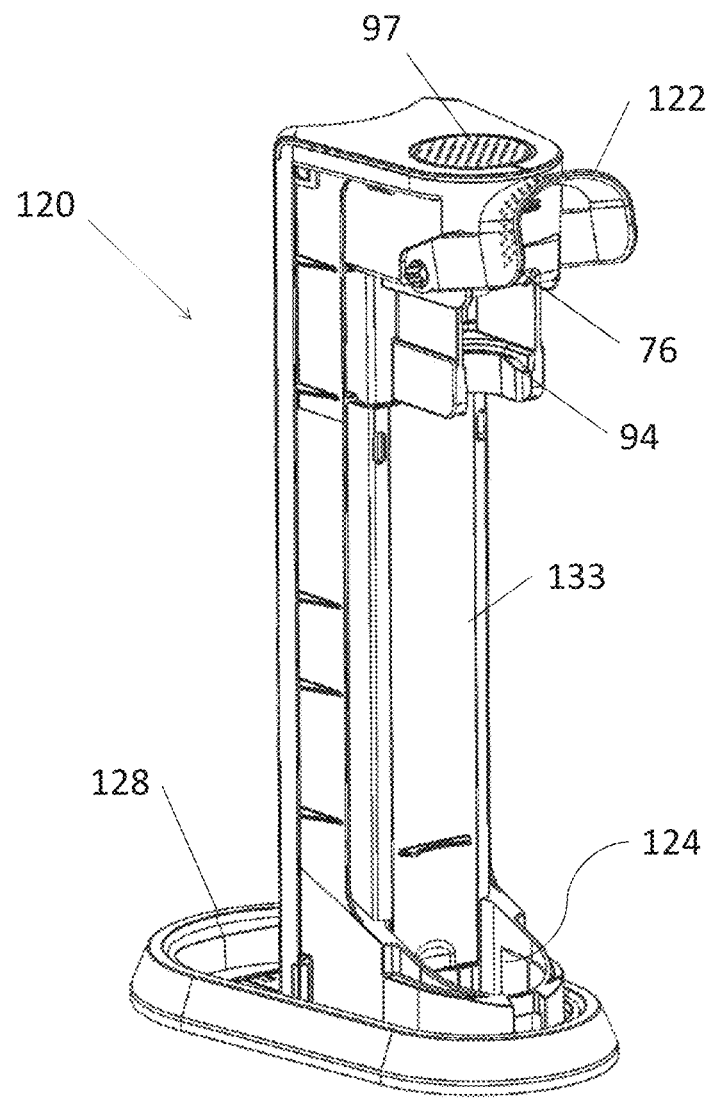
FIG. 12A schematically illustrates an example of a carbonation machine with a canister holder having a handle that is raised to enable placement of a gas canister.

FIG. 12A schematically illustrates an example of a carbonation machine with a canister holder having a handle that is raised to enable insertion of a gas canister.

Handle 122 of carbonation machine 120 may be raised or lowered by rotation about axis 127. In carbonation machine 120, yoke 94 is coupled to handle 122 by a mechanism (visible in FIG. 12D). When handle 122 is raised, as in the example shown, yoke 94 is lowered away from canister connector 76. The space between yoke 94 and canister connector 76 is sufficient to enable placement of a gas canister valve 10 between yoke 94 and canister connector 76.

Figure 12B:
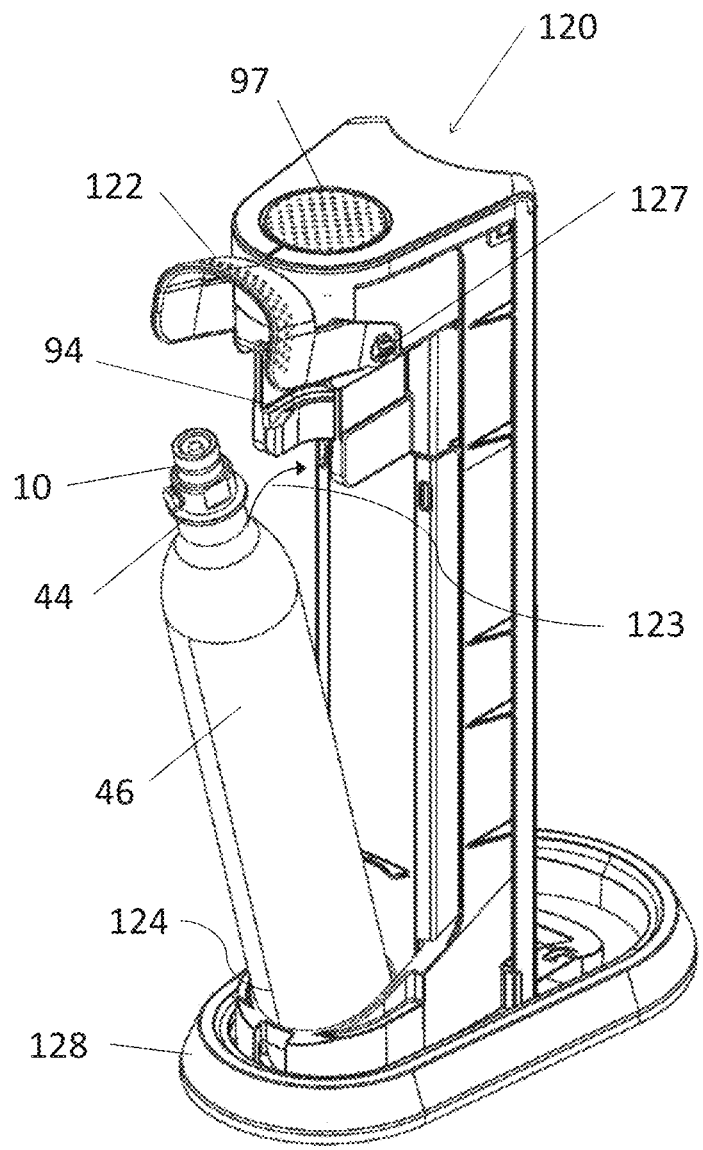
FIG. 12B schematically illustrates placing a canister into the canister holder shown in FIG. 12A.

FIG. 12B schematically illustrates placing a canister into the canister holder shown in FIG. 12A.

As shown, opening 124 in base 128 of carbonation machine 120 enables placement of a bottom end of gas canister 46 (e.g., an end of gas canister 46 that is opposite the end to which gas canister valve 10 is attached) into opening 124. Rotation of gas canister valve 10 toward yoke 94 (as indicated by arrow 123) may place disk 44 (or other lateral projection from gas canister 46) above yoke 94.

Opening 124 may be configured to align a gas canister 46 that is placed into opening 124 with canister connector 76. For example, the alignment may include orienting an axis of gas canister 46 to be parallel with an axis of canister connector 76, and laterally aligning the axes such that gas canister 46 is coaxial with canister connector 76.

Figure 12C:
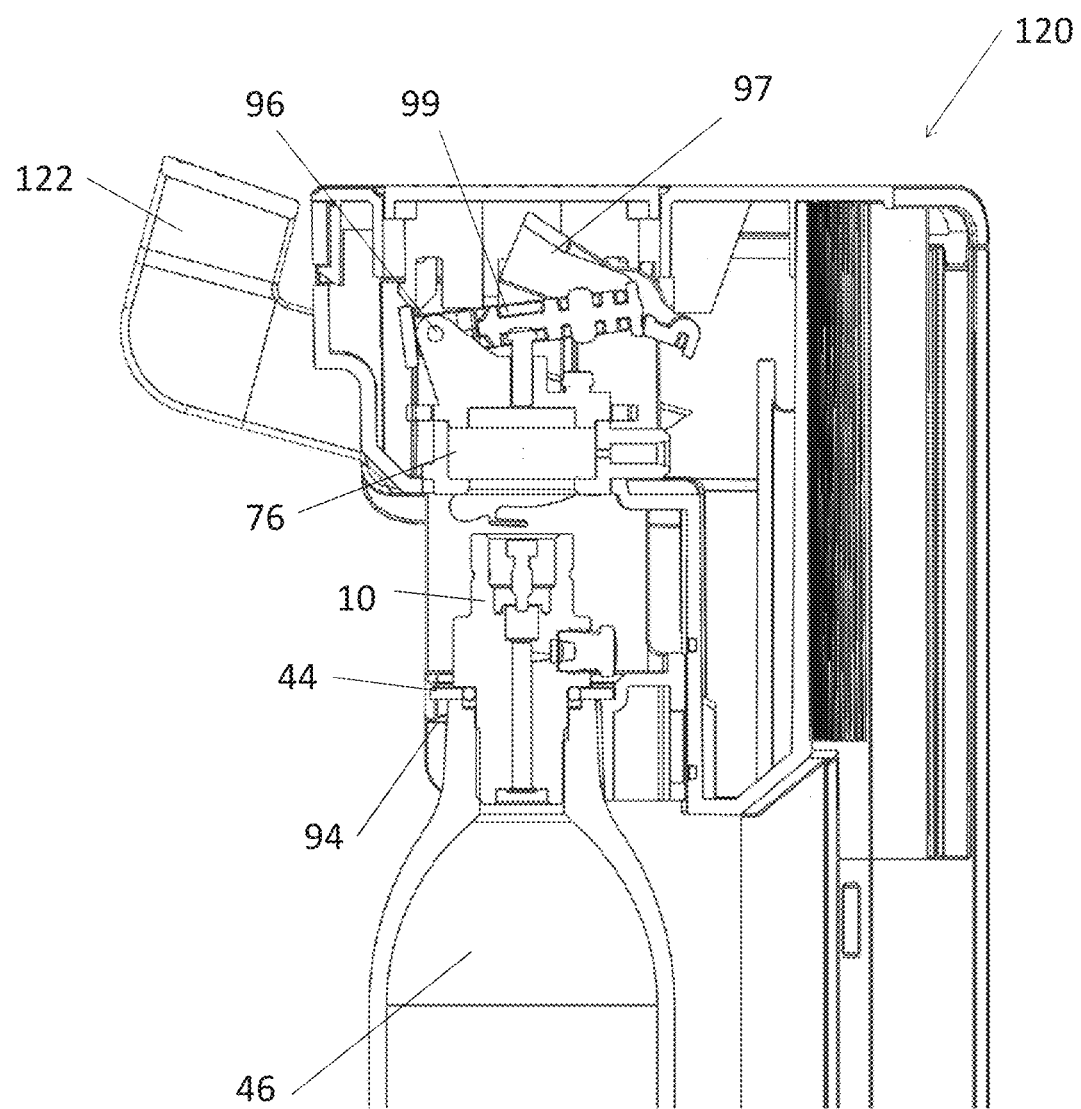
FIG. 12C is a schematic sectional view of the canister holder shown in FIG. 12B with the canister placed inside the holder.

FIG. 12C is a schematic sectional view of the canister holder shown in FIG. 12B with the canister placed inside.

In the example shown, a partially raised floor region 124a of opening 124 is designed to present an uneven floor surface 129 so as to cause gas canister 46 to independently tilt towards the yoke, and lean on the internal radius of the yoke, thereby aligning with the socket of the canister connector 76.

Raised floor region 124a covers part of (e.g., an arced segment of) the space of opening 124. The remainder of opening 124 may include a lower region 124b. In the example shown, opening 124 has no floor in lower region 124b. In other examples, raised floor region 124a may be raised above a floor of lower region 124b.

The area of raised floor region 124a is shaped and sized such that the center of gravity of gas canister 46 (typically along or near canister cylinder axis 131) is over lower region 124b. As a result, when gas canister 46 is placed in opening 124, gravity may rotate gas canister 46 to lean against the internal radius of the yoke and align with (e.g., a socket canister connector 76.

It may be noted that, although an opening 124 with raised floor region 124a is shown and described in connection with carbonation machine 120, a raised floor region 124a may be incorporated into other examples (e.g., the examples shown in 8, 9, and 11).

Figure 12D:
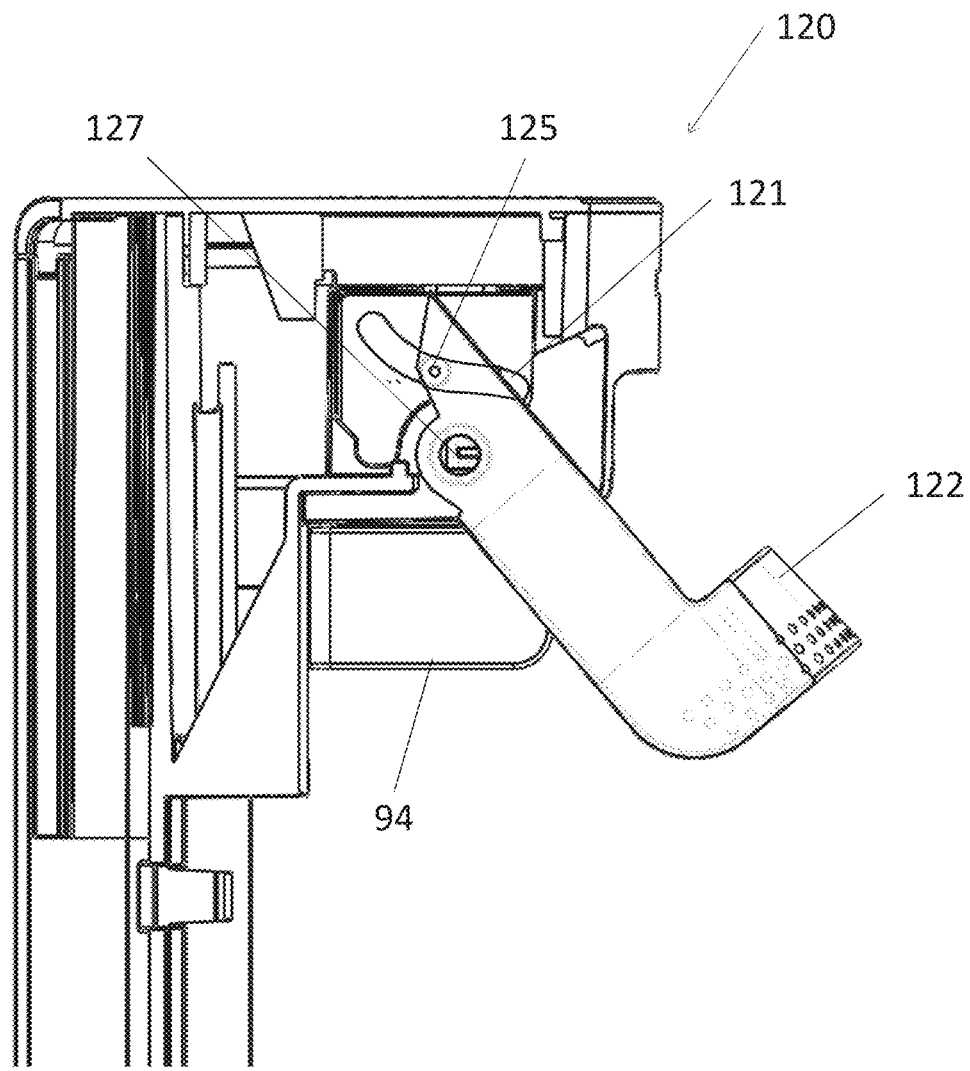
FIG. 12D schematically illustrates a lifting mechanism of the canister holder shown in 12C.
Figure 12E:
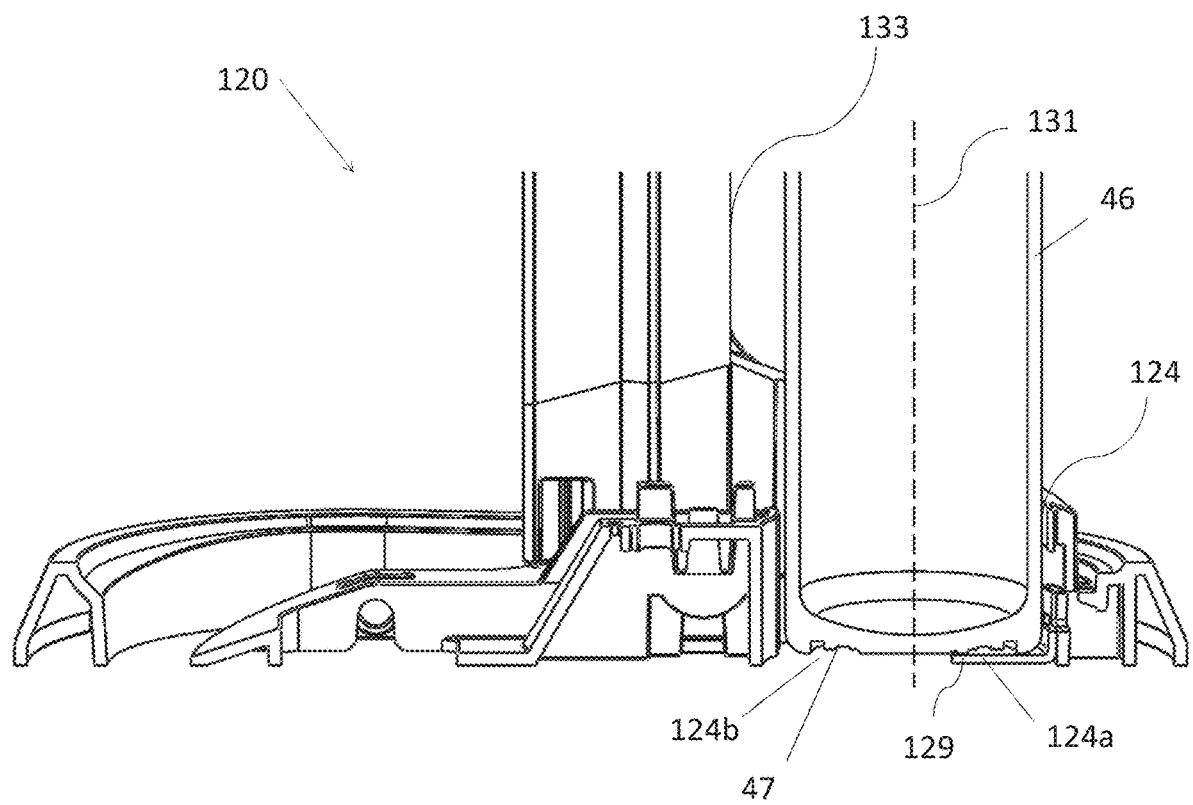
FIG. 12E schematically illustrates an example of a base of the carbonating machine shown in 12B that is configured to tilt the canister valve into the yoke after insertion of the canister in the base.

FIG. 12D schematically illustrates a lifting mechanism of the canister holder shown in 12C. FIG. 12E schematically illustrates an example of a base of the carbonating machine shown in 12B that is configured to tilt the cylinder valve into the yoke after insertion of the cylinder in the base.

As shown, disk 44 of gas canister 46 is resting on yoke 94. Pin 125 is attached to handle 122 and is inserted into slot 121 on yoke 94. Lowering of handle 122 by rotation about axis 127 rotates pin 125 outward from carbonation machine 120. Slot 121 is curved (as in the example shown) or slanted or is otherwise non-horizontal and non-vertical such that an outer end of slot 121 is lower than an inner end of slot 121. Accordingly, the outward rotation of pin 125 due to lowering of handle 122 exerts an upward force on slot 121 and yoke 94. Therefore, lowering of handle 122 may raise yoke 94, and a gas canister 46 that is placed on yoke 94, toward canister connector 76.

Figure 13A:
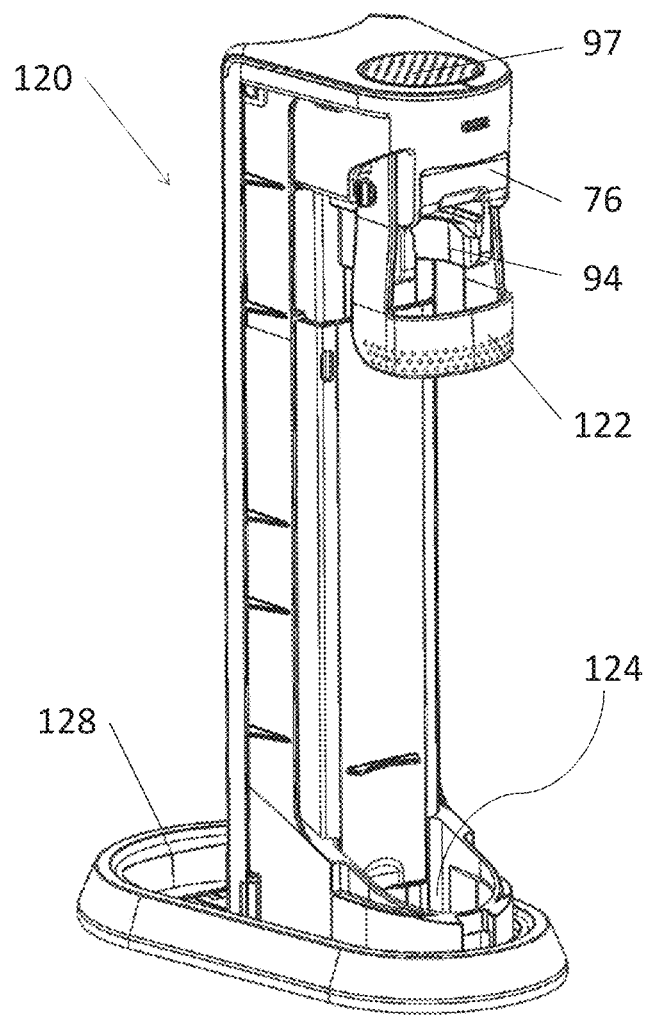
FIG. 13A schematically illustrates the carbonation machine shown in FIG. 12A with the handle lowered to insert a gas canister into the carbonation machine.

FIG. 13A schematically illustrates the carbonation machine shown in FIG. 12A with the handle lowered to insert a gas canister into the carbonation machine.

As shown, handle 122 has been fully lowered. Therefore, yoke 94 is fully raised toward canister connector 76.

Figure 13B:
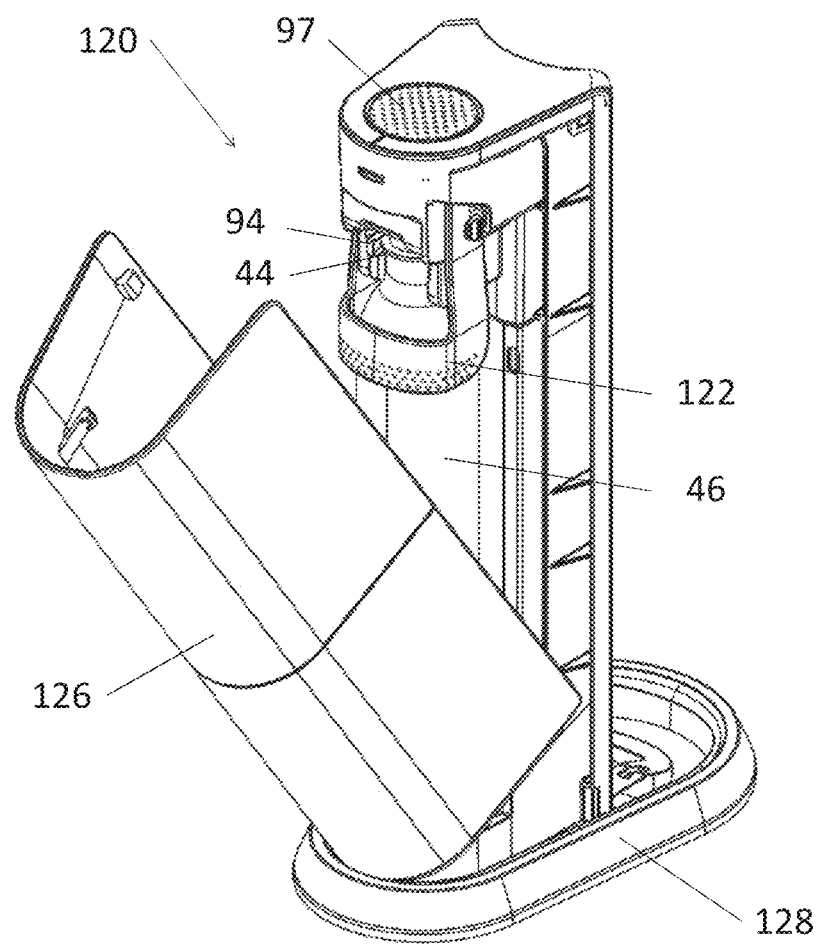
FIG. 13B schematically illustrates a canister inserted into the carbonation machine shown in FIG. 13A.
Figure 13C:
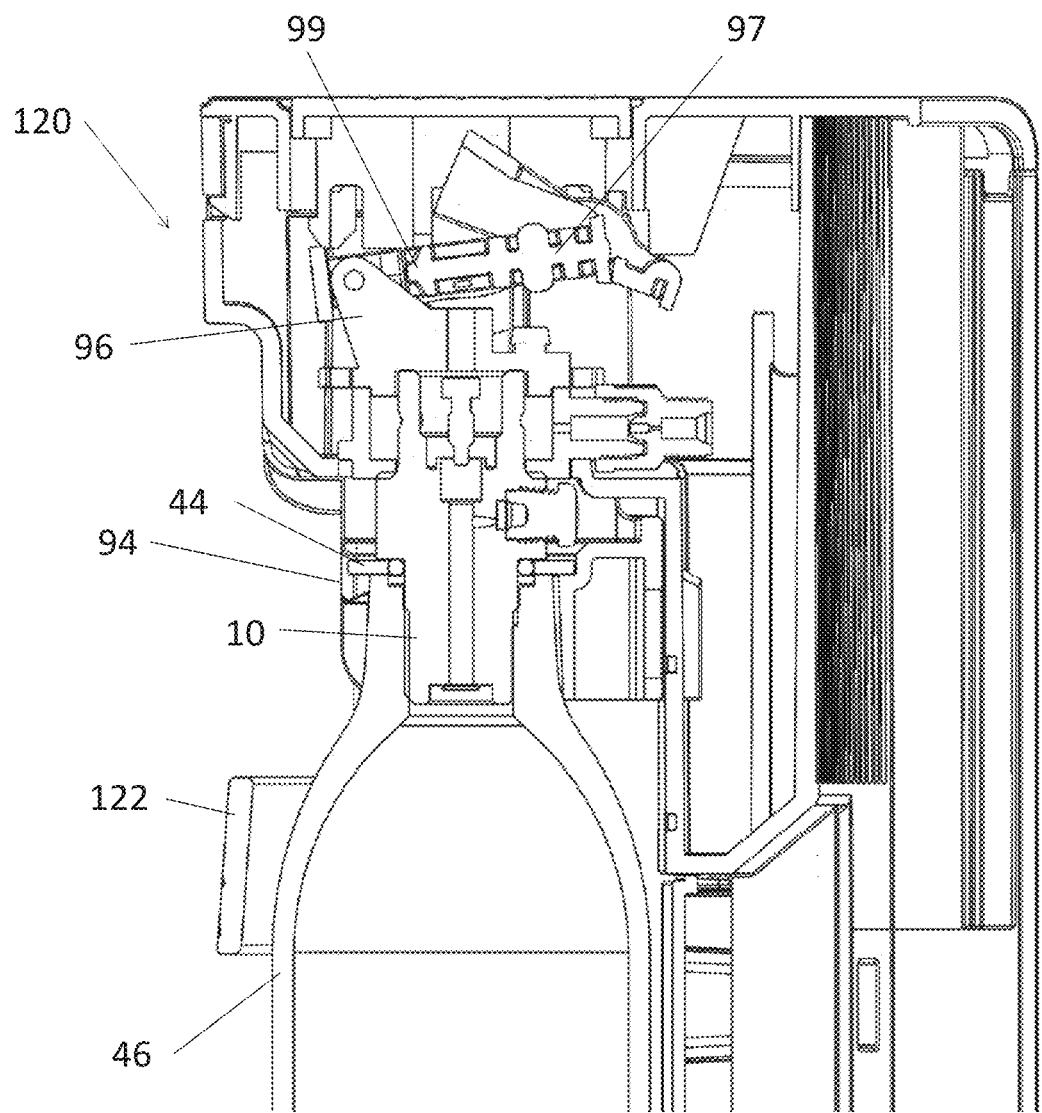
FIG. 13C is a schematic sectional view of the canister inserted in the carbonation machine in FIG. 13B.

FIG. 13B schematically illustrates a canister inserted into the carbonation machine shown in FIG. 13A. FIG. 13C is a schematic sectional view of the canister inserted in the carbonation machine in FIG. 13B.

As shown, handle 122 has been lowered over gas canister 46. In some cases, when handle 122 is fully lowered, handle 122 may provide further shielding or protection to the connection between gas canister valve 10 and canister connector 76.

As a result of the lowering of handle 122, hinged lever mechanism 96 lifts gas canister valve 10 into canister connector 76. Therefore, operation of gas release control 97 and activation mechanism 99 may operate gas canister valve 10 to release gas from gas canister 46 to flow to a carbonation head of carbonation machine 120.

After insertion of gas canister 46 into carbonation machine 120, canister cover 126 may be inserted into base 128 and closed.

FIG. 14A schematically illustrates a filling head adapter to enable connection of a gas canister valve with laterally oriented exterior ports to filling head of a canister filling system. FIG. 14B schematically illustrates a view of the canister valve adapter shown in FIG. 14A, showing a side of the adapter into which the canister valve is insertable. FIG. 14C is a schematic cross sectional view of the canister valve adapter shown in FIG. 14A.

Filling head adapter 150 may be mounted on a filling head of a canister filling system. For example, the filling head, prior to mounting of filling head adapter 150, may be designed to enable insertion of a canister valve in which the exterior port of the valve is oriented along, or parallel to, the longitudinal axis of the canister. Mounting of filling head adapter 150 on the filling head provides a fluidic path between a longitudinally oriented filling port of the filling head and the laterally oriented exterior ports 16 of the canister valve.

For example, filling head adapter 150 may include mounting structure 156 (e.g., holes as in the example shown, threading, or one or more brackets, projections, or other structure), to enable or facilitate mounting of filling head adapter 150 onto the filling head. In the example shown, mounting filling head adapter 150 onto the filling head may include inserting bolts, screws, rivets, clips, or other mounting elements through mounting structure 156 and into the filling head. Sealing structure (e.g., an O-ring, sealing disk, or other sealing structure) may be mounted, e.g., within sealer groove 154, between filling head adapter 150 and the filling head.

When filling head adapter 150 is mounted on the filling head, a fluidic path may be formed between a filling port of the filling head and exterior ports 16 of a canister valve that is inserted into interior space 160 of filling head adapter 150. When the canister valve is inserted into interior space 160, valve seal 166 (e.g., an O-ring as shown, or a sealing disk or other sealing structure) may prevent leakage of gas to a space within interior space 160 that is in fluidic contact with plunger 26 of the canister valve. Canister limiting structure 161 may facilitate proper positioning of gas canister 46 and the canister valve within interior space 160. In some cases, canister seal 168 (e.g., an O-ring or other type of seal) may prevent or inhibit leakage of gas to the outside of interior space 160 between gas canister 46 and filling head adapter 150.

When the canister valve is inserted into interior space 160 of filling head adapter 150, pressurized gas (e.g., in gaseous or liquefied form) may be released from the canister filling system via a longitudinally oriented filling port. The lateral channel 152 of filling head adapter 150 may be located so as to be in fluidic connection with the filling port. A seal between lateral channel 152 and the filling head, e.g., within sealer groove 154, may prevent or impede leakage or any other flow of the gas other than along lateral channel 152. The released pressurized gas may flow laterally from the filling port along lateral channel 152 to one or more longitudinal channels 162, e.g., at one or more ends of lateral channel 152. The pressurized gas may flow into filling head adapter 150 via each longitudinal channel 162 to a radial channel 164, each of which is oriented radially or otherwise laterally within filling head adapter 150. The pressurized gas may flow laterally inward within each radial channel 164 to exterior ports 16 of the canister valve. Valve seal 166 and canister seal 168 may facilitate the flow of pressurized gas from radial channels 164 into exterior ports 16.

Indentations 158 may facilitate holding of filling head adapter 150, e.g., when mounting to the filling head. Bores 159 in indentations 158 may also facilitate drilling, machining, or otherwise forming radial channels 164.

In some examples, a tube may form a fluidic connection between the filling port of the filling head to a bore 159 of filling head adapter 150.

Figure 14D:
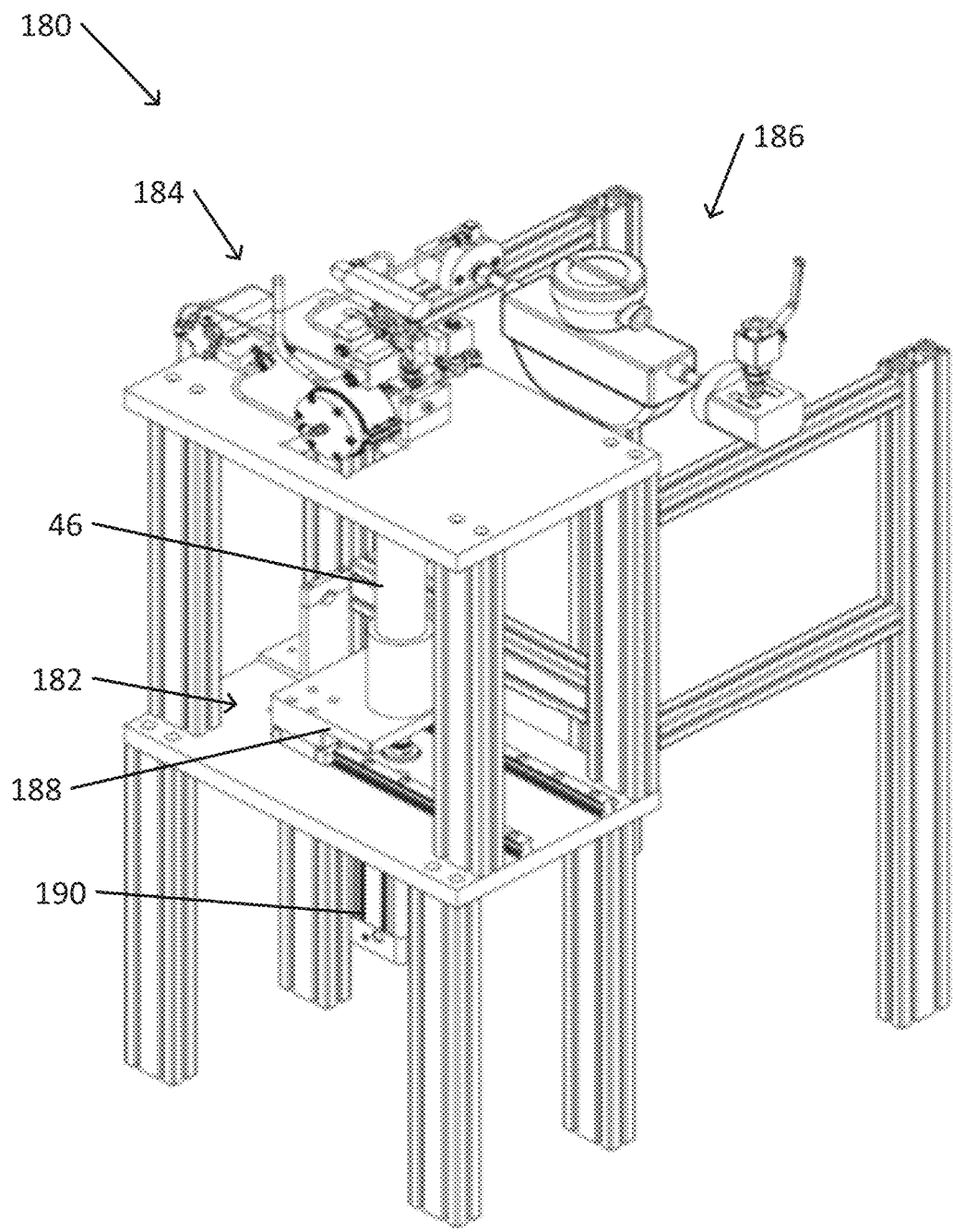
FIG. 14D schematically illustrates canister filling machine incorporating the canister valve adapter shown in FIG. 14A.
Figure 14E:
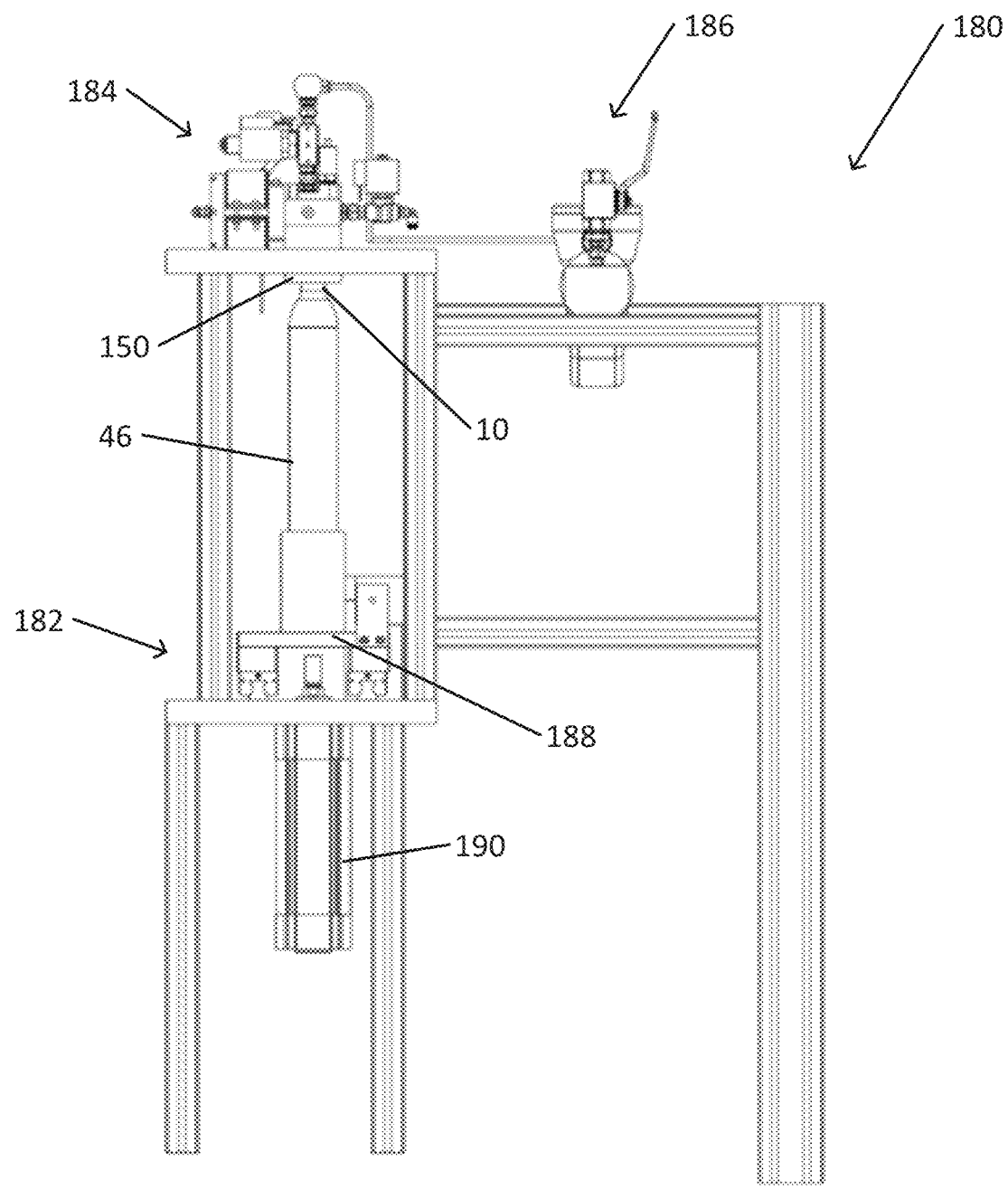
FIG. 14E is a schematic side view of the canister filling machine shown in FIG. 14D.

14D schematically illustrates a canister filling machine incorporating the canister valve adapter shown in FIG. 14A. FIG. 14E is a schematic side view of the canister filling machine shown in FIG. 14D.

Canister filling machine 180 may be a component of a canister filling system. Canister filling machine 180 is configured to fill a gas canister 46 whose gas canister valve 10 is inserted into filling head adapter 150 with compressed (e.g., liquefied) gas from a gas source (not shown). For example, canister filling machine 180 may be controllable by an automatic (e.g., computerized) control system or a manually. The gas may flow in a controlled manner to filling head adapter 150 via filling head 184. For example, filling head 184 may include various regulation and control units, such as electrically controllable valves (e.g., solenoid valves), pressure transducers, or other control units. Canister filling machine 180 may include monitoring and control components 186, e.g., including a shutoff valve and a mass flow meter.

Canister filling machine 180 may include canister-loading assembly 182. In the example shown, canister-loading assembly 182 includes a linear conveyor 188 that is configured to convey an upright (e.g., substantially vertical with gas canister valve 10 oriented upward) gas canister 46 to along a linear track to a position below filling head adapter 150 and filling head. When gas canister 46 is positioned below filling head adapter 150, linear piston 190 may lift gas canister 46 so that gas canister valve 10 is inserted into filling head adapter 150. In other examples, the orientations of at least some components of the canister filling machine and the canister-loading assembly may be inverted. In this case, the loading assembly may be configured to lower an inverted gas canister 46 to insert gas canister valve 10 into a filling head adapter 150 below the gas canister 46. In other examples, gas canister valve may be pushed horizontally or in another orientation into filling head adapter 150.

Figure 15B:
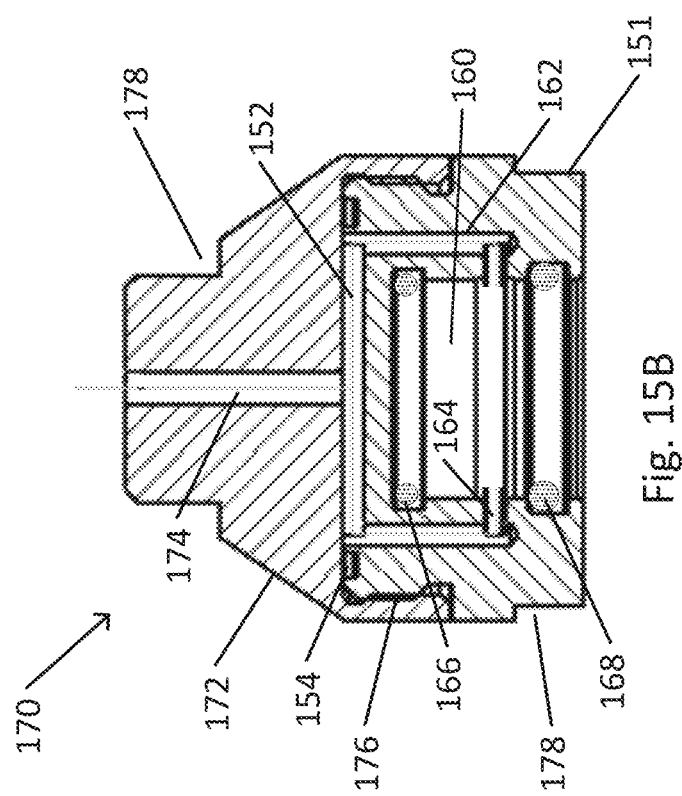
FIG. 15B is a schematic cross section of the canister valve adapter shown in FIG. 15A.
Figure 15A:
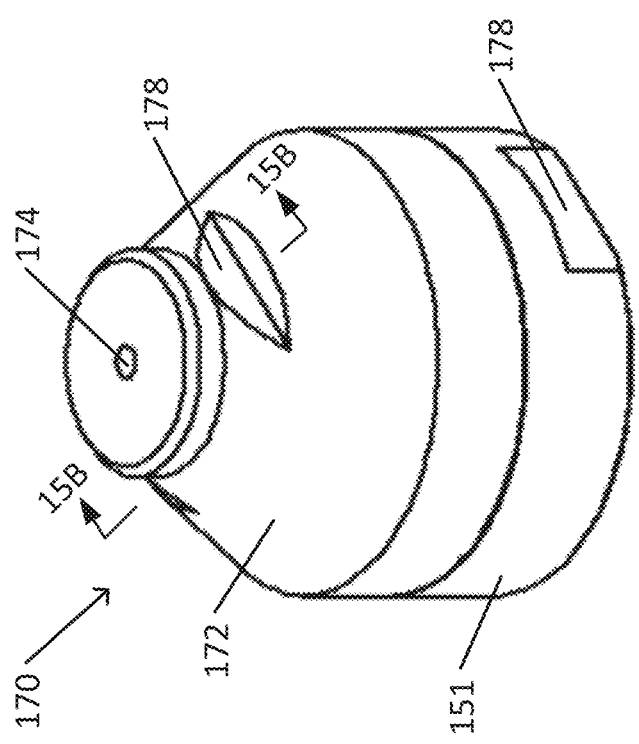
FIG. 15A schematically illustrates a canister valve adapter for placement on canister valve with laterally oriented exterior ports to enable connection of the canister valve to a filling head of a canister filling system.

FIG. 15A schematically illustrates a canister valve adapter for placement on canister valve with laterally oriented exterior ports to enable connection of the canister valve to a filling head of a canister filling system. FIG. 15B is a schematic cross section of the canister valve adapter shown in FIG. 15A.

Canister valve adapter 170 is configured for placement over and attachment to a canister valve that includes laterally oriented exterior ports 16. Canister valve adapter 170 may then enable filling of a gas canister 46 to which the canister valve is attached by a filling head whose filling port is oriented longitudinally.

In the example shown, canister valve adapter 170 is assembled from two components, canister valve fitting 151 and filling head fitting 172. In the example shown, canister valve fitting 151 and filling head fitting 172 are attached to one another by threading 176. Sealing between longitudinal channel 174 of filling head fitting 172 and lateral channel 152 of canister valve fitting 151 may be provided by a seal (e.g., O-ring, gasket, or other sealing structure) that is placed within sealer groove 154. In other examples, filling head fitting 172 may be attached to canister valve fitting 151 by welding or soldering, or by using one or more bolts, screws, pins, clips, adhesives, or other attachment structure. Indentations 178 may facilitate assembly or handling during use.

Filling head fitting 172 is shaped to enable canister valve adapter 170 to fit into a filling head of a canister filling system. For example, at least a distal (to gas canister 46) end of filling head fitting 172 may be shaped similarly to a distal end of a canister valve with a longitudinal exterior port at its distal end. When canister valve adapter 170 is placed on a canister valve, the distal end of the canister valve may fit within interior space 150 within canister valve fitting 151. Valve seal 166 (e.g., an O-ring as shown, a sealing disk, or other sealing structure) may prevent leakage of pressurized gas to a space within interior space 160 that is in fluidic contact with plunger 26 of the canister valve. Canister seal 168 may prevent leakage of pressurized gas at the interface between Canister valve fitting 151 is constructed similarly to filling head adapter 150, as described above. When canister valve adapter 170 is inserted into the filling head of a canister filling system, longitudinal channel 174 within filling head fitting 172 may be in fluidic connection with the filling port of the filling head. Pressurized gas may therefore flow from the filling port, via longitudinal channel 174, to lateral channel 152 of canister valve fitting 151. The pressurized gas may flow within canister valve fitting 151 via each longitudinal channel 162 to a radial channel 164, each of which is oriented radially or otherwise laterally within canister valve fitting 151. The pressurized gas may flow laterally inward within each radial channel 164 to the laterally oriented exterior ports 16 of the canister valve. Valve seal 166 and canister seal 168 may facilitate the flow of pressurized gas form radial channels 164 into exterior ports 16.

Different embodiments are disclosed herein. Features of certain embodiments may be combined with features of other embodiments thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of filling a gas canister with pressurized or liquified gas from a canister filling machine, the method comprising:
    inserting a valve of a gas canister into an interior space of an adapter, through an opening of the adapter that is shaped to enable insertion of the valve, the adapter enabling a fluidic connection of the gas canister valve to a filling port of the filling machine, and comprising at least one channel that is configured, when the valve is inserted into the opening, to conduct pressurized or liquified gas from the filling port to the valve, the valve comprising: a canister port facing an interior of the gas canister and at least one exterior port that opens laterally to a longitudinal axis of the valve for facilitating inflow of the gas into and outflow of the gas out of the canister when the valve is in an open position, and to prevent the inflow or the outflow when the valve is in a closed position; and
    filling the gas canister with the pressurized or liquified gas while maintaining the valve in the open position.

2. The method of claim 1, further comprising maintaining said at least one exterior port stationary with respect to the gas canister, at all times when the valve is inserted in the adapter.

3. The method of claim 1, further comprising connecting the adapter to a filling head of the canister filling machine.

4. The method of claim 1, wherein the adapter is mounted on the canister filling machine.

5. The method of claim 1 further comprising operating a poppet that is slidable along the longitudinal axis and which, when in the open position, allows fluidic communication between the at least one exterior port and the canister port to enable inflow to the canister via said at least one exterior port or outflow from the canister via said at least one exterior port, and which, when in the closed position prevents fluid communication between the at least one exterior port and the canister port.

6. The method of claim 5, comprising providing a resilient restoring structure configured to apply a restoring force to the poppet to maintain the poppet at the closed position.

7. The method of claim 6, further comprising using a plunger with an exterior surface to provide an inward pushing force to overcome the restoring force and to slide the poppet from the closed position to the open position.

8. The method of claim 1, wherein said at least one exterior port comprises a plurality of exterior ports.

9. An adapter comprising:
    a body having an opening that is shaped to enable insertion of a valve of a gas canister that is configured to hold a pressurized or liquefied gas for carbonating a liquid, the valve comprising a canister port to a confined space within the gas canister, the valve also comprising at least one exterior port that opens laterally to the longitudinal axis of the valve; and
    at least one channel that is configured to conduct pressurized gas from a filling port of a canister filling machine to one or more channels that are in fluidic communication with said at least one exterior port of a valve that is inserted into the opening,
    wherein the adapter is configured to facilitate filling of the gas canister with the pressurized or liquified gas, while said at least one lateral exterior port is maintained stationary with respect to the gas canister at all times when the valve is inserted within the adapter.

10. The adapter of claim 9, wherein the at least one channel comprises at least one laterally oriented channel that is configured to be in fluidic communication with the filling port when the adapter is attached to the filling machine.

11. The adapter of claim 9, wherein the adapter comprises structure to enable attachment of the adapter to the valve, a distal end of the adapter configured to connect to a filling head of the filling machine.

12. The adapter of claim 11, where the at least one channel comprises a longitudinally oriented channel at the distal end that is configured to be in fluidic communication with the filling port when the distal end is connected to the filling head.

* * * * *